United States Patent
Kim et al.

(10) Patent No.: US 9,001,220 B2
(45) Date of Patent: Apr. 7, 2015

(54) IMAGE SENSOR CHIP, METHOD OF OBTAINING IMAGE DATA BASED ON A COLOR SENSOR PIXEL AND A MOTION SENSOR PIXEL IN AN IMAGE SENSOR CHIP, AND SYSTEM INCLUDING THE SAME

(71) Applicant: Samsung Electronics Co., Ltd., Suwon-si (KR)

(72) Inventors: Tae Chan Kim, Yongin-si (KR); Moo Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 13/837,634

(22) Filed: Mar. 15, 2013

(65) Prior Publication Data

US 2014/0009648 A1     Jan. 9, 2014

(30) Foreign Application Priority Data

Jul. 3, 2012 (KR) .................. 10-2012-0072462

(51) Int. Cl.
| H04N 5/228 | (2006.01) |
| H04N 5/351 | (2011.01) |
| H04N 5/232 | (2006.01) |
| H04N 5/343 | (2011.01) |
| H04N 5/369 | (2011.01) |

(52) U.S. Cl.
CPC ........... *H04N 5/351* (2013.01); *H04N 5/23241* (2013.01); *H04N 5/343* (2013.01); *H04N 5/3696* (2013.01)

(58) Field of Classification Search
CPC ....................................................... H04N 5/343
USPC ..................... 348/207.99, 208.14, 222.1, 294
See application file for complete search history.

(56) References Cited

U.S. PATENT DOCUMENTS

| 7,408,572 B2 | 8/2008 | Baxter et al. |
| 7,925,051 B2 | 4/2011 | Gensolen et al. |
| 8,687,069 B2 * | 4/2014 | Kobayashi ............... 348/208.12 |
| 2004/0169748 A1 | 9/2004 | Acharya |
| 2006/0197664 A1 * | 9/2006 | Zhang et al. .................. 348/155 |
| 2010/0033611 A1 | 2/2010 | Lee et al. |
| 2010/0102206 A1 | 4/2010 | Cazaux et al. |
| 2010/0182468 A1 * | 7/2010 | Posch et al. .................... 348/294 |
| 2010/0284565 A1 * | 11/2010 | Benkley et al. ............... 382/103 |
| 2011/0025893 A1 | 2/2011 | Kim et al. |
| 2011/0074989 A1 | 3/2011 | Fossum et al. |
| 2011/0128423 A1 | 6/2011 | Lee et al. |
| 2011/0234481 A1 * | 9/2011 | Katz et al. ..................... 348/746 |
| 2013/0037815 A1 * | 2/2013 | Okajima et al. ................ 257/59 |

FOREIGN PATENT DOCUMENTS

| JP | 2008-79172 A | 4/2008 |
| KR | 10-2010-0045204 A | 5/2010 |
| KR | 10-1108742 B1 | 2/2012 |

* cited by examiner

*Primary Examiner* — Gevell Selby
(74) *Attorney, Agent, or Firm* — Sughrue Mion, PLLC

(57) ABSTRACT

A method of operating an image sensor chip, which includes a color sensor pixel and a dynamic vision sensor (DVS) pixel sensing a motion of an object, is provided. The method includes enabling one of the color sensor pixel and the DVS pixel according to a mode selection signal and processing a pixel signal output from the enabled pixel.

20 Claims, 35 Drawing Sheets

| R | G | R | G | R | G |
|---|---|---|---|---|---|
| B | Z | B | Z | B | Z |
| R | G | M |   | R | G |
| B | Z |   |   | B | Z |
| R | G | R | G | R | G |
| B | Z | B | Z | B | Z |

110-6b

Motion Sensor Pixel Group

3D Sensor Pixel Group

IMAGE SENSOR CHIP, METHOD OF OBTAINING IMAGE DATA BASED ON A COLOR SENSOR PIXEL AND A MOTION SENSOR PIXEL IN AN IMAGE SENSOR CHIP, AND SYSTEM INCLUDING THE SAME

CROSS-REFERENCE TO RELATED APPLICATIONS

This application claims priority under 35 U.S.C. §119(a) from Korean Patent Application No. 10-2012-0072462 filed on Jul. 3, 2012, the disclosure of which is hereby incorporated by reference in its entirety.

BACKGROUND

Exemplary Embodiments relate to an image sensor chip. More particularly, exemplary embodiments relate to a method of obtaining image data based on a pixel signal output from one of a color sensor pixel and a motion sensor pixel in an image sensor chip and systems using the method.

A complementary metal-oxide semiconductor (CMOS) image sensor is a sensing device using CMOS. The CMOS image sensor is cheaper than a charge coupled device (CCD) image sensor, and consumes less power than the CCD image sensor. The CMOS image sensor consumes less power than the CCD image sensor because the CMOS image sensor includes smaller elements than the CCD image sensor. In addition, as performance of the CMOS image sensor has improved, the CMOS image sensor is used for electrical appliances, including portable devices, i.e., smart phones and digital cameras.

However, a CMOS image sensor in a mobile environment requires minimum power consumption. Since there is a trade-off relationship between power consumption and performance, it is desired to minimize the power consumption while still maintaining the performance of the CMOS image sensor.

SUMMARY

According to an aspect of an exemplary embodiment, there is provided a method of operating an image sensor chip which includes a color sensor pixel and a dynamic vision sensor (DVS) pixel sensing a motion of an object. The method includes enabling one of the color sensor pixel and the DVS pixel according to a mode selection signal and processing a pixel signal output from the enabled pixel.

The method may further include, before the enabling one of the color sensor pixel and the DVS pixel, enabling the DVS pixel by default and changing a level of the mode selection signal based on a pixel signal output from the default enabled DVS pixel.

According to an aspect of another exemplary embodiment, there is provided a method of operating an image sensor chip which includes a color sensor pixel and a DVS pixel sensing a motion of an object. The method includes enabling the DVS pixel, determining whether to enable the color sensor pixel according to a mode selection signal, and processing a pixel signal output from one of the DVS pixel and the color sensor pixel, based on a determination result and the mode selection signal.

According to an aspect of another exemplary embodiment, there is provided an image sensor chip including a pixel array including a color sensor pixel group, the color sensor pixel group includes a plurality of color sensor pixels, and a DVS pixel group, the DVS pixel group includes a plurality of DVS pixels sensing a motion of an object; a control circuit which is configured to enable one of the color sensor pixel group and the DVS pixel group according to a mode selection signal; and a pixel signal processing circuit which is configured to process pixel signals output from the enabled pixel group.

The image sensor chip may further include a motion sensor pixel enable controller, which is configured to control a power supply to the DVS pixel group according to a control of the control circuit.

The pixel signal processing circuit may include a row address event representation (AER) which is configured to process at least one of a plurality of event signals generated by the respective DVS pixels and a column AER which is configured to process at least another one of the event signals generated by the respective DVS pixels. The row AER may be disposed opposite a row driver which enables each of the color sensor pixels.

Alternatively, the pixel signal processing circuit may include a row AER which is configured to process at least one of a plurality of event signals generated by the respective DVS pixels and a column AER which is configured to process at least another one of the event signals generated by the respective DVS pixels. The row AER may be disposed at a same side as a side of a row driver which enables each of the color sensor pixels.

According to an aspect of another exemplary embodiment, there is provided a system-on-chip (SoC) including the above-described image sensor chip, an image signal processor (ISP) which is configured to process image data output from the image sensor, and a central processing unit (CPU) which is configured to receive processed image data from the ISP and to generate a mode selection signal based on the processed image data.

According to an aspect of another exemplary embodiment, there is provided an image sensor chip including a pixel array including a color sensor pixel, a depth sensor pixel, and a DVS pixel; and an output selection circuit which is configured to select one of a signal received from the color sensor pixel and the depth sensor pixel and a signal received from the DVS pixel according to a mode selection signal and to output the selected signal.

According to an aspect of another exemplary embodiment, there is provided an image processing system including an image sensor which generates digital image data corresponding to either color image data from at least one color sensor pixel or motion image data from at least one motion sensor pixel, and transmits the digital image data; an image signal processor (ISP) which is configured to receive and process the digital image data from the image sensor, and transmit the processed image data; and a display unit which receives the processed image data from the ISP, and displays the processed image data.

BRIEF DESCRIPTION OF THE DRAWINGS

The above and other features and advantages of the exemplary embodiments will become more apparent by describing in detail exemplary embodiments thereof with reference to the attached drawings, in which.

DETAILED DESCRIPTION OF THE EXEMPLARY EMBODIMENTS

Figure 1:
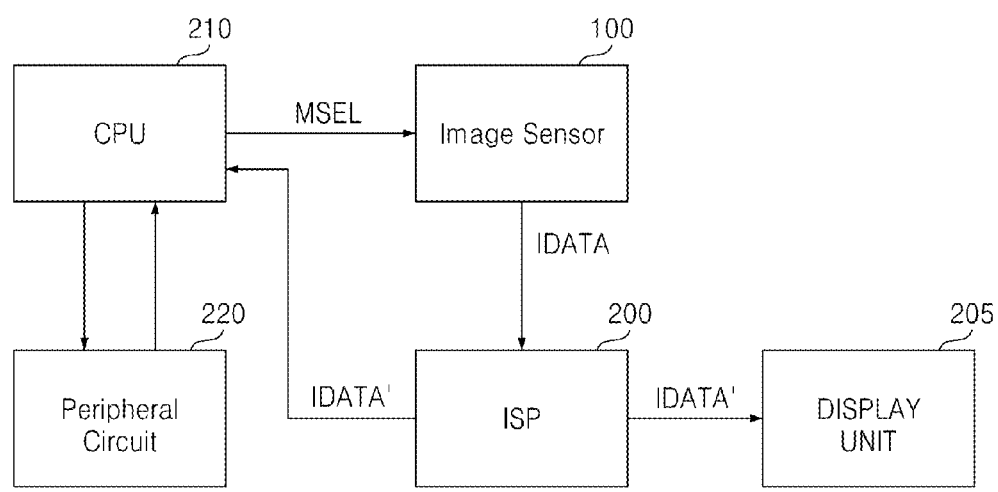
FIG. 1 is a block diagram of an image processing system according to some embodiments.

Exemplary embodiments will be described more fully hereinafter with reference to the accompanying drawings, in which embodiments are shown. This exemplary embodiments may, however, be embodied in many different forms and should not be construed as limited to the embodiments set forth herein. Rather, these embodiments are provided so that this disclosure will be thorough and complete, and will fully convey the scope of the exemplary embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the exemplary embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which these exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 according to some embodiments. The image processing system 10 may include an image sensor 100, an image signal processor (ISP) 200, a display unit 205, a central processing unit (CPU) 210, and a peripheral circuit 220. The image processing system 10 may be implemented as a system-on-chip (SoC).

The image processing system 10 may have both a function of a color sensor obtaining color image data of an object, and a function of a motion sensor sensing the motion of the object, and obtaining motion image data. The motion sensor may analyze an image continuously shot by frames and may store shading information of the analyzed frame in a frame memory (not shown) in a form of a digital code. The motion sensor may compare shading information of a previous frame, that has been stored in the frame memory, with shading information of a current frame, that is presently input, and sense the motion of an object. In addition, when obtaining shading information of a pixel, the motion sensor may process shading information of adjacent pixels (e.g., four pixels in respective four directions) at the same time, and calculate the moving direction of shading.

Alternatively, the motion sensor may include a signal storage element (e.g., a capacitor) in a pixel. The motion sensor may store a voltage corresponding to a pixel signal of a previous frame, compare the voltage with a voltage corresponding to a pixel signal of a current frame, and sense the motion of an object.

The image sensor 100 may generate color image data output from at least one color sensor pixel (not shown) or motion image data output from at least one motion sensor pixel (not shown), and transmit digital image data IDATA to the ISP 200. The image sensor 100 may output the image data IDATA corresponding to the color image data or the motion image data, according to a mode selection signal MSEL received from the CPU 210.

For instance, the image sensor 100 may output the image data IDATA, corresponding to the motion image data, when the mode selection signal MSEL is at a low level and may output the image data IDATA, corresponding to the color image data, when the mode selection signal MSEL is at a high level. However, the exemplary embodiments are not limited to these examples. In other embodiments, the image sensor 100 may include at least one depth sensor pixel (not shown), and output depth image data together with the color image data.

The image sensor 100 may be implemented as a separate chip. The image sensor 100 may be a complementary metal-oxide semiconductor (CMOS) image sensor.

The ISP 200 may receive the image data IDATA, process the image data IDATA, and generate a processed image data IDATA'. The ISP 200 may process the image data IDATA into frames. The ISP 200 may also adjust the brightness, contrast, and color saturation of the image data IDATA. When the image data IDATA includes depth image data, the ISP 200 may generate depth information of the depth sensor pixel using a time-of-flight (TOF) method, and embed the depth information in the processed image data IDATA'.

The ISP 200 may include the frame memory, compare the shading information of a previous frame with the shading information of a current frame, and generate motion image data according to a comparison result. Alternatively, the ISP 200 may process the shading information of a pixel and the shading information of adjacent pixels together, and calculate the moving direction of shading. The ISP 200 may also transmit the processed image data IDATA' to the display unit 205 and the CPU 210.

The ISP 200 may control a control register block (not shown) included in the image sensor 100, such that the overall operation of the image sensor 100 is controlled. Although the ISP 200 is implemented outside the image sensor 100 in the embodiments illustrated in FIG. 1, exemplary embodiment are not restricted. The ISP 200 may be implemented inside the image sensor 100.

The display unit 205 may display the processed image data IDATA'. The display unit 205 may be any device that can output images. The display unit 205 may be implemented as an electronic device, such as a computer, a mobile phone, or a camera.

The CPU 210 may receive the processed image data IDATA' from the ISP 200, and generate the mode selection signal MSEL based on the processed image data IDATA'. The CPU 210 may transmit the mode selection signal MSEL to the image sensor 100.

When the image processing system 10 is powered on, the CPU 210 may output the mode selection signal MSEL at a default level, e.g., the low level. When the CPU 210 determines that mode modification is necessary, based on the processed image data IDATA', it may output the mode selection signal MSEL at a changed level, e.g., the high level.

The CPU 210 may compare the processed image data IDATA' with a mode modification code that has been stored to generate the mode selection signal MSEL. When the processed image data IDATA' is the same as the mode modification code, the CPU 210 may change the level of the mode selection signal MSEL.

The mode modification code may be a specific two-dimensional (2D) image, such as a person's fingerprint or face, a three-dimensional (3D) image including depth information, or a reference motion image corresponding to a continuous motion, such as a hand gesture.

When the mode modification code is a motion image of a finger drawing a circle, the CPU 210 may determine whether the processed image data IDATA' corresponds to the motion image of a finger drawing a circle, and generate the mode selection signal MSEL according to a determination result. However, the exemplary embodiments are not be limited by the type of the mode modification code.

In a case where only the motion sensor operates by default and the color sensor pixel is deactivated in a sleep mode, when a specific motion input by a user is the same as the mode modification code, the CPU 210 may activate the color sensor pixel or a system connected to the image processing system, such as a power system, an audio system, or a specific application.

The mode modification code may be changed at a user's request and may be set to a default value.

The CPU 210 may generate the mode selection signal MSEL based on a signal (or data) received from the peripheral circuit 220, and transmit the mode selection signal MSEL to the image sensor 100.

The image sensor 100 may output the image data IDATA corresponding to color image data, or motion image data according to the mode selection signal MSEL. The peripheral circuit 220 may provide a signal (or data) generated according to a system state or input for the CPU 210.

The peripheral circuit 220 may be implemented as an input/output (I/O) interface. In this case, the peripheral circuit 220 may transmit a signal generated according to a user's input to the CPU 210. The I/O interface may be any type of I/O device, such as an external input button, a touch screen, or a mouse.

Alternatively, the peripheral circuit 220 may be implemented as a power monitoring module. In this case, when the peripheral circuit 220 determines that system power is not sufficient, it may transmit a signal corresponding to the determination to the CPU 210. As another alternative, the peripheral circuit 220 may be implemented as an application execution module. In this case, when a specific application is executed, the peripheral circuit 220 may transmit a signal generated by the execution to the CPU 210. The specific application may be a camera shooting application, an augmented reality application, or an application requiring a camera image.

Figure 2:
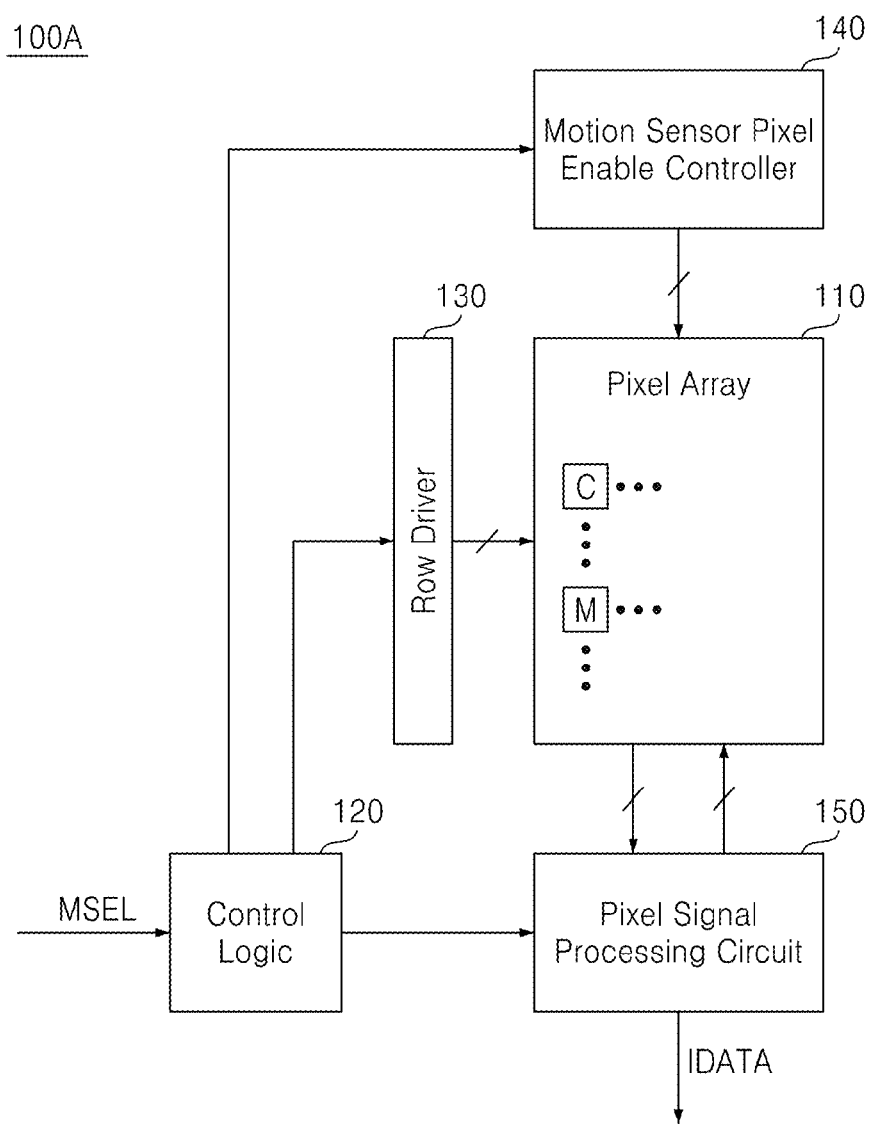
FIG. 2 is a block diagram of an image sensor illustrated in FIG. 1 according to some embodiments.

FIG. 2 is a block diagram of an image sensor 100A according to some embodiments. The image sensor 100A may include a pixel array 110, a control logic (or a control circuit) 120, a row driver 130, a motion sensor pixel enable controller 140, and a pixel signal processing circuit 150.

The pixel array 110 includes a plurality of color sensor pixels C obtaining color image data of an object, and a plurality of motion sensor pixels M sensing the motion of the object. The pixel array 110 may also include a color filter array, (not shown) which includes a plurality of color filter layers (not shown) transmitting light with a predetermined wavelength.

The pixel array 110 may also include a depth sensor pixel (not shown) obtaining depth information of the object. When a pixel signal of the depth sensor pixel is processed using the TOF method, the image sensor 100A may also include an infrared pass filter (not shown) which filters out light other than infrared light emitted by an infrared light source (not shown) controlled by the control logic 120, and infrared light reflected from an object after being emitted by the infrared light source.

The motion sensor pixels M may be implemented by dynamic vision sensor (DVS) pixels, but exemplary embodiments are not restricted.

The control logic 120 may control the overall operation of the image sensor 100A based on the mode selection signal MSEL. The control logic 120 may control the row driver 130, the motion sensor pixel enable controller 140, and pixel signal processing circuit 150.

The row driver 130 may enable the color sensor pixels C by rows, according to the control of the control logic 120.

The motion sensor pixel enable controller 140 may enable the motion sensor pixels M, according to the control of the control logic 120. The motion sensor pixel enable controller 140 may also control power supply to the motion sensor pixels M, according to the control of the control logic 120.

The control logic 120 may control the row driver 130 and the motion sensor pixel enable controller 140 based on the mode selection signal MSEL to enable a group, among a color sensor pixel group including the color sensor pixels C and a motion sensor pixel group including the motion sensor pixels M. At this time, the pixel signal processing circuit 150 may process a pixel signal (e.g., a pixel signal output from each of the motion sensor pixels M or a pixel signal output from each of the color sensor pixels C) output from the pixel array 110, and output a processing result as the image data IDATA.

Alternatively, the control logic 120 may control only whether to enable the color sensor pixel group, including the color sensor pixels C, according to the mode selection signal MSEL in a state where the motion sensor pixel group including the motion sensor pixels M has been enabled. At this time, the pixel signal processing circuit 150 may select a pixel signal output from a motion sensor pixel M, or a pixel signal output from a color sensor pixel C according to the control of the control logic 120, and output the image data IDATA based on a selection result.

When the motion sensor pixels M are implemented by DVS pixels, the pixel signal processing circuit 150 may include an address event representation (AER) (not shown). The AER may process an event signal output from each of the motion sensor pixels M sensing a change in the quantity of light, and transmit a reset signal to each motion sensor pixel M that has generated the event signal. The disposition of the AER will be described in detail with reference to FIGS. 3, 17, 18, and 20 later.

When the pixel array 110 includes depth sensor pixels (not shown), enabling control on the depth sensor pixels and processing of pixel signals, output from the depth sensor pixels, are substantially the same as enabling control on the color sensor pixels C and processing of pixel signals, output from the color sensor pixels C.

Figure 3:
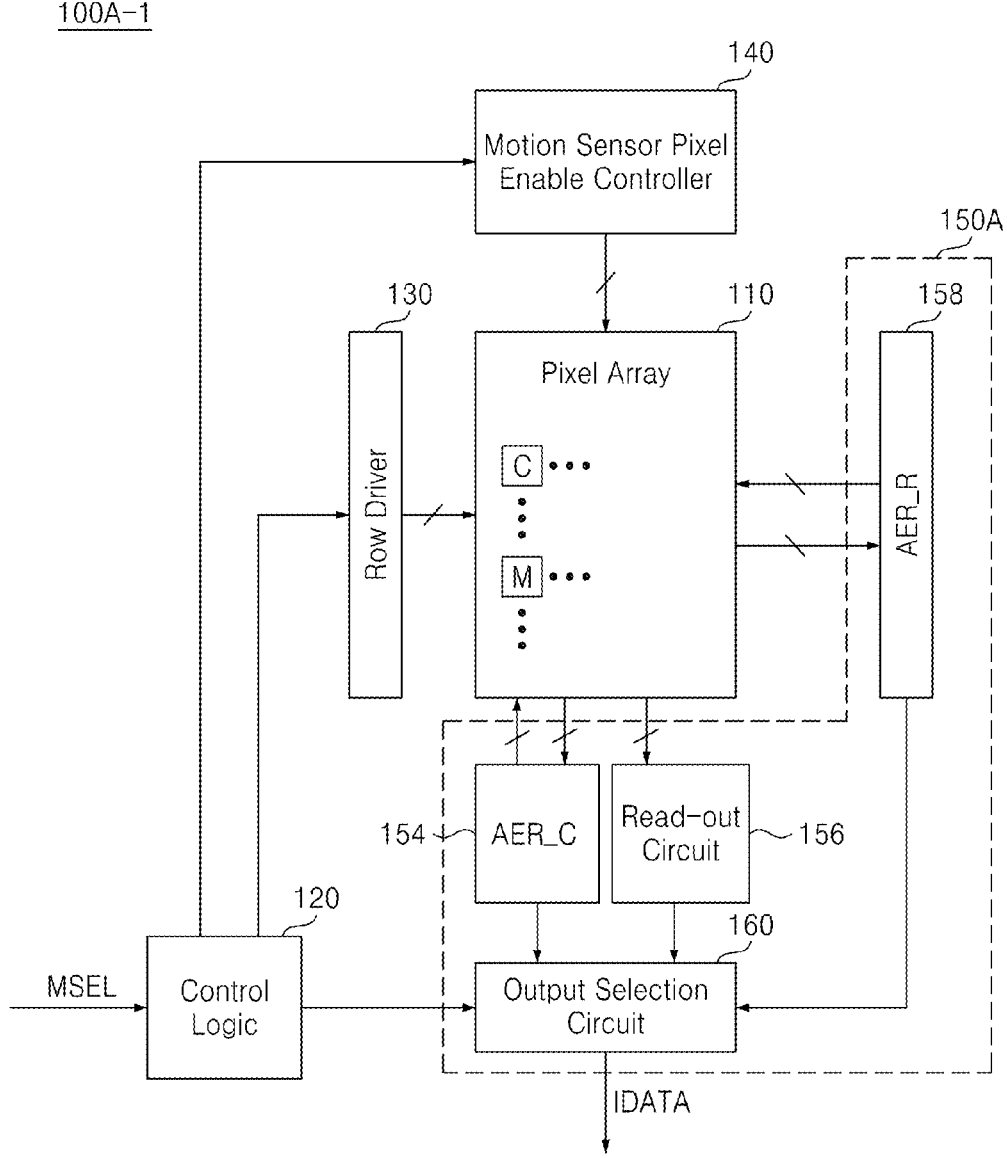
FIG. 3 is a block diagram of an image sensor including an example of a pixel signal processing circuit illustrated in FIG. 2.

FIG. 3 is a block diagram of an image sensor 100A-1 including an example 150A of the pixel signal processing circuit 150 illustrated in FIG. 2. FIG. 3 shows the image sensor 100A-1 that include the motion sensor pixels M implemented by DVS pixels.

Referring to FIGS. 2 and 3, the pixel signal processing circuit 150A illustrated in FIG. 3 may include a column AER 154, a read-out circuit 156, a row AER 158, and an output selection circuit 160.

Each of the motion sensor pixels M included in the pixel array 110 may output an event signal according to a change in the quantity of light. The event signal will be described in detail with reference to FIG. 13. The column AER 154 may receive the event signal and output a column address value of each motion sensor pixel M, which has generated the event signal, based on the event signal.

The read-out circuit 156 may receive a pixel signal output from each of the color sensor pixels C included in the pixel array 110, and process the pixel signal.

The read-out circuit 156 may include a column decoder (not shown), a column driver (not shown), a correlated double sampling (CDS) block (not shown), an analog-to-digital converter (ADC) block (not shown), and an output buffer (not shown).

The column AER 154 and the read-out circuit 156 may be implemented in separate circuits, respectively.

The row AER 158 may receive the event signal output from each motion sensor pixel M, and output a row address value of each motion sensor pixel M, which has generated the event signal, based on the event signal. The row address value may be transmitted to the output selection circuit 160.

The row AER 158 may be implemented opposite the row driver 130.

The output selection circuit 160 may select at least one output among an output of the column AER 154, an output of the row AER 158, and an output of the read-out circuit 156, according to the control of the control logic 120, and output the image data IDATA based on a selection result.

The output selection circuit 160 may select the output of the column AER 154 and the output of the row AER 158 according to the control of the control logic 120, and output the image data IDATA based on a selection result.

Alternatively, the output selection circuit 160 may select the output of the read-out circuit 156 according to the control of the control logic 120, and output the image data IDATA based on a selection result.

The output selection circuit 160 may be implemented by a unit, e.g., a multiplexer, which selects one from among a plurality of input signals. However, the exemplary embodiments are not restricted thereto. When a signal is output from one of the color sensor pixel group, including the color sensor pixels C, and the motion sensor pixel group, including the motion sensor pixels M, the output selection circuit 160 may bypass the signal.

When the pixel array 110 includes the depth sensor pixels, the output selection circuit 160 may select a pixel signal output from a color sensor pixel C or a depth sensor pixel or a pixel signal output from a motion sensor pixel M, according to the mode selection signal MSEL, and output the selected signal.

Figure 4:
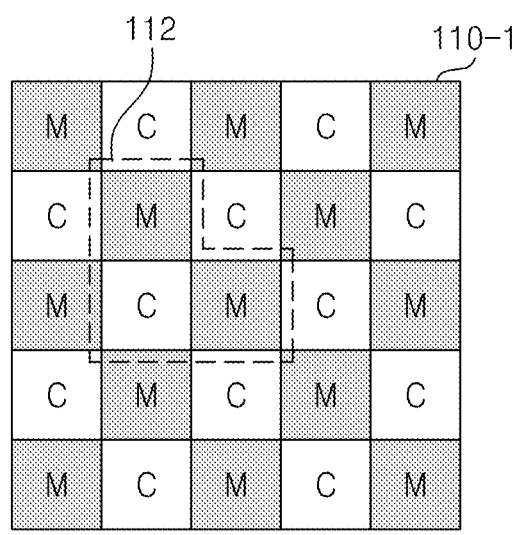
FIG. 4 is a diagram of a pixel arrangement of a pixel array illustrated in FIG. 2 according to some embodiments.
Figure 4:
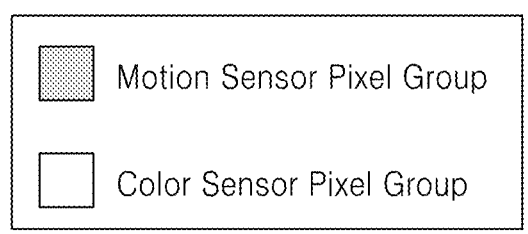
Figure 5:
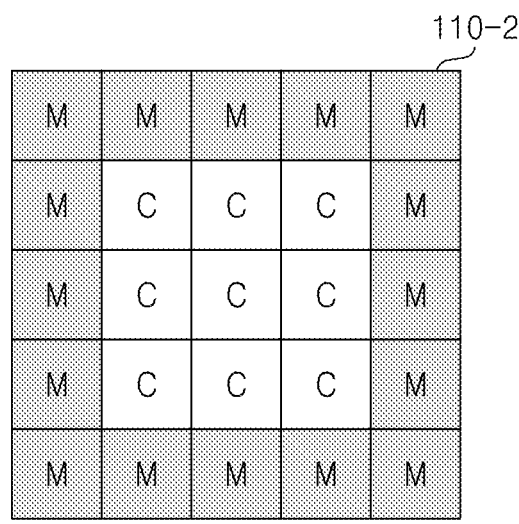
FIG. 5 is a diagram of a pixel arrangement of the pixel array illustrated in FIG. 2 according to other embodiments.
Figure 5:
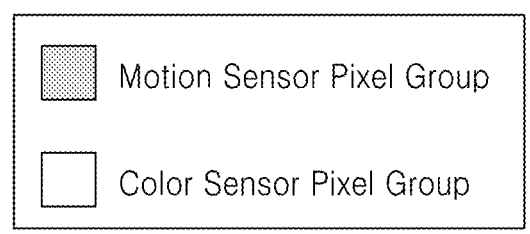
Figure 6:
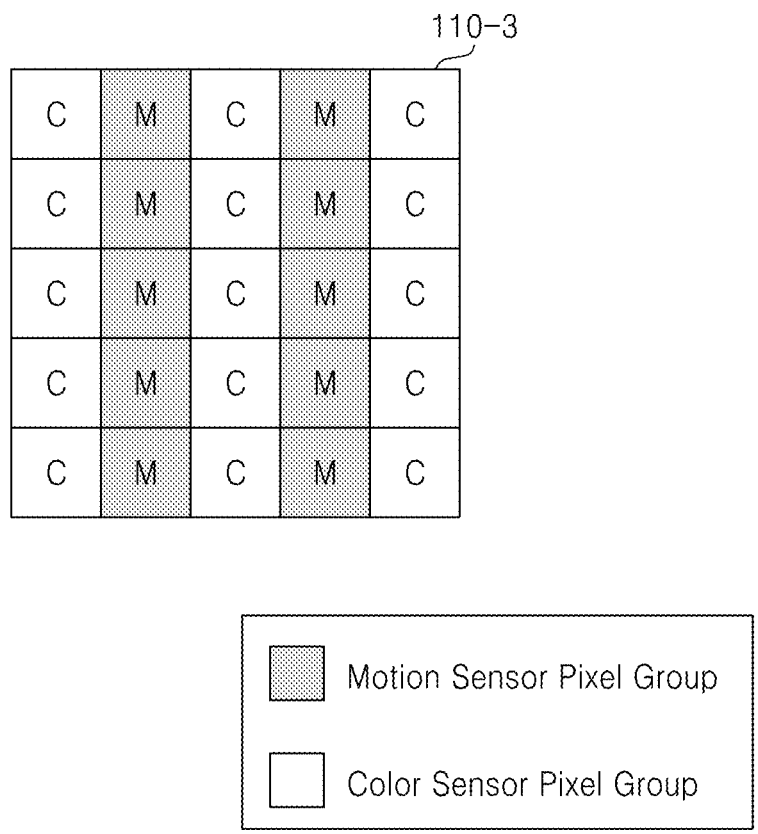
FIG. 6 is a diagram of a pixel arrangement of the pixel array illustrated in FIG. 2 according to further embodiments.
Figure 7:
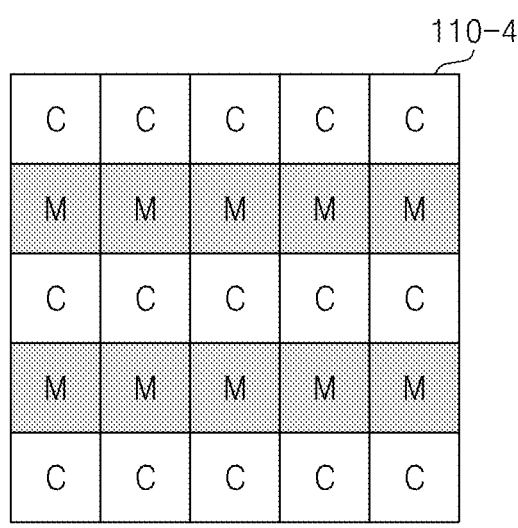
FIG. 7 is a diagram of a pixel arrangement of the pixel array illustrated in FIG. 2 according to other embodiments.
Figure 7:
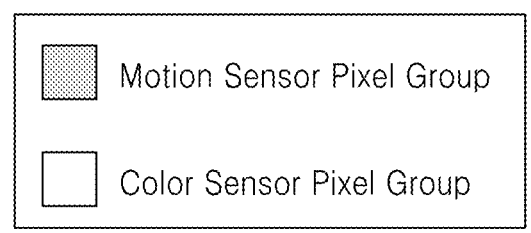
Figure 8A:
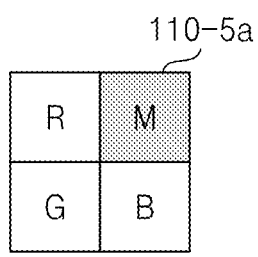
FIG. 8A is a diagram of a pixel arrangement of the pixel array illustrated in FIG. 2 according to yet other embodiments.
Figure 8A:
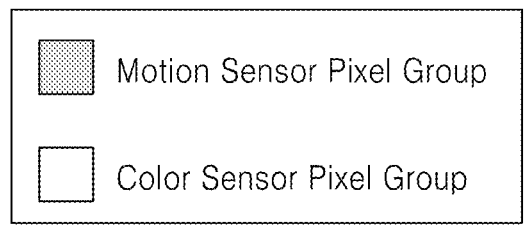
Figure 8B:
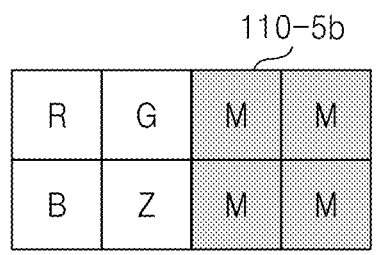
FIG. 8B is a diagram of a pixel arrangement of the pixel array illustrated in FIG. 2 according to still other embodiments.
Figure 8B:
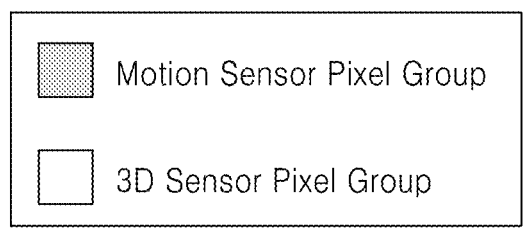
Figure 9A:
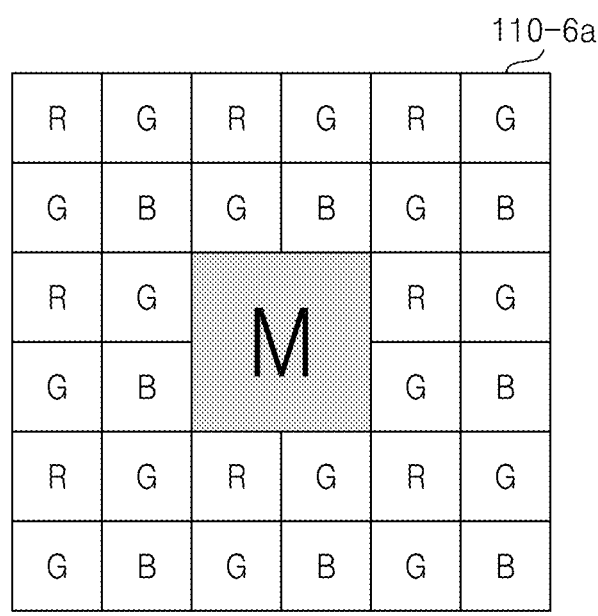
FIG. 9A is a diagram of a pixel arrangement of the pixel array illustrated in FIG. 2 according to further embodiments.
Figure 9A:
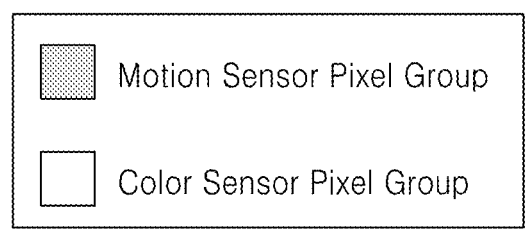
Figure 9B:
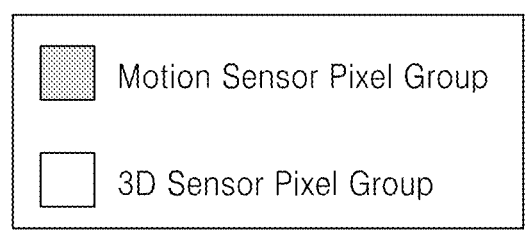
FIG. 9B is a diagram of a pixel arrangement of the pixel array illustrated in FIG. 2 according to other embodiments

FIG. 4 is a diagram of a pixel arrangement 110-1 of the pixel array 110 illustrated in FIG. 2 according to some embodiments. FIG. 5 is a diagram of a pixel arrangement 110-2 of the pixel array 110 illustrated in FIG. 2, according to other embodiments. FIG. 6 is a diagram of a pixel arrangement 110-3 of the pixel array 110 illustrated in FIG. 2 according to further embodiments. FIG. 7 is a diagram of a pixel arrangement 110-4 of the pixel array 110 illustrated in FIG. 2 according to other embodiments. FIG. 8A is a diagram of a pixel arrangement 110-5a of the pixel array 110 illustrated in FIG. 2 according to yet other embodiments. FIG. 8B is a diagram of a pixel arrangement 110-5b of the pixel array 110 illustrated in FIG. 2 according to still other embodiments. FIG. 9A is a diagram of a pixel arrangement 110-6a of the pixel array 110 illustrated in FIG. 2 according to further embodiments. FIG. 9B is a diagram of a pixel arrangement 110-6b of the pixel array 110 illustrated in FIG. 2 according to other embodiments.

For convenience, it is assumed that the pixel array 110 has a 5×5 matrix form, with 5 rows and 5 columns, in the embodiments illustrated in FIGS. 4 through 7. However, the exemplary embodiments are not restricted thereto.

Referring to FIG. 2 and FIGS. 4 through 7, the pixel array 110 may include the color sensor pixel group including the color sensor pixels C, and the motion sensor pixel group including the motion sensor pixels M. The motion sensor pixel group may include DVS pixels that may operate with a lower power than the color sensor pixels C.

Either or both of the color sensor pixel group and the motion sensor pixel group may be enabled, according to the mode selection signal MSEL.

When the motion sensor pixel group that operates with low power is enabled by default, the color sensor pixel group is in the sleep mode, and a user's motion is the same as the motion modification code, the color sensor pixel group may be enabled according to the mode selection signal MSEL. In the pixel arrangement 110-1 illustrated in FIG. 4, each of the color sensor pixels C may be placed between motion sensor pixels M.

A plurality of motion sensor pixels M may be placed between adjacent color sensor pixels C, but exemplary embodiments are not restricted thereto.

Alternatively, the color sensor pixels C and the motion sensor pixels M may be arranged at irregular intervals.

The pixel arrangement 110-2 illustrated in FIG. 5 may include the color sensor pixel group, placed in an inner side, and the motion sensor pixels M, placed at the border of the color sensor pixel group.

In other words, the motion sensor pixel group including the motion sensor pixels M may be arranged at the edge of the color sensor pixel group including the color sensor pixels C. Alternatively, the color sensor pixels C may be arranged at the edge of the motion sensor pixel group including the motion sensor pixels M.

Although the motion sensor pixels M are arranged in a single line at the border of the color sensor pixel group, they may be arranged in multiple lines.

The pixel arrangement 110-3 illustrated in FIG. 6 may include only color sensor pixels C or only motion sensor pixels M, in each column. In other words, the motion sensor pixels M alternate with the color sensor pixels C in a row direction (i.e., in a horizontal direction).

Although a column of color sensor pixels C alternates with a column of motion sensor pixels M in the embodiments illustrated in FIG. 6, a plurality of columns of motion sensor pixels M may be placed between adjacent columns of color sensor pixels C.

Columns of color sensor pixels C and columns of motion sensor pixels M may be arranged at irregular intervals.

The columns of color sensor pixels C and the columns of motion sensor pixels M may include line-optical black (L-OB) pixels to remove row noise. For instance, a column of L-OB pixels may be arranged at each of the left and right sides of an area in which the columns of color sensor pixels C and the columns of motion sensor pixels M are arranged. However, exemplary embodiments are not restricted to this example.

The row noise is noise that is included in a pixel signal, output from a color sensor pixel C. The row noise may cause a horizontally stripped pattern to occur in the image data IDATA. The row noise is mainly caused by the change in power supplied to the image sensor 100, noise occurring at the driving of the row driver 130, etc. The row noise has a time-variant characteristic.

The ISP 200 may remove the row noise by subtracting a pixel signal of an L-OB pixel from a pixel signal of a color sensor pixel C in the same row as the L-OB pixel, and generate the processed image data IDATA'.

The L-OB pixel may include a shield layer (not shown) shielding incident light.

The pixel arrangement 110-4 illustrated in FIG. 7 may include only color sensor pixels C, or only motion sensor pixels M in each row. In other words, the motion sensor pixels M alternate with the color sensor pixels C in a column direction (i.e., in a vertical direction).

Although a row of color sensor pixels C alternates with a row of motion sensor pixels M in the embodiments illustrated in FIG. 7, a plurality of rows of motion sensor pixels M may be placed between adjacent rows of color sensor pixels C.

Rows of color sensor pixels C and rows of motion sensor pixels M may be arranged at irregular intervals.

The rows of color sensor pixels C and the rows of motion sensor pixels M may include L-OB pixels to remove row noise.

FIGS. 8A through 9B illustrate different pixel arrangements 110-5a and 110-6a of the pixel array 110, depending on the relative sizes of the motion sensor pixels M and the color sensor pixels C, and different pixel arrangements 110-5b and 110-6b of the pixel array 110 when the pixel array 110 includes a depth sensor pixel Z.

The pixel arrangement 110-5a illustrated in FIG. 8A corresponds to a case where the size of motion sensor pixels M is the same as that of RGB color sensor pixels R, G, and B. Since a single motion sensor pixel M has the same size as each of the RGB color sensor pixels R, G, and B, when the pixel array 110 has a 2×2 matrix form, the pixel arrangement 110-5a includes one motion sensor pixel M and the RGB color sensor pixels R, G, and B.

In the pixel arrangement 110-5b illustrated in FIG. 8B, the RGB color sensor pixels R, G, and B and a depth sensor pixel Z are arranged in a Bayer pattern. RGB color sensor pixels R, G, and B and depth sensor pixels Z may form a 3D sensor pixel group. At least one motion sensor pixel M may be placed around the Bayer pattern.

The pixel arrangement 110-6a illustrated in FIG. 9A corresponds to a case where the size of a motion sensor pixel M is the same as the size of a group of four RGB color sensor pixels R, G, and B. Since the size of the single motion sensor pixel M is the same as that of a Bayer pattern composed of four RGB color sensor pixels R, G, and B, the motion sensor pixel M and the four RGB color sensor pixels R, G, and B may be arranged according to one of the pixel arrangements 110-1 through 110-4, which are respectively illustrated in FIGS. 4 through 7.

In the pixel arrangement 110-6b illustrated in FIG. 9B, the size of a motion sensor pixel M is the same as that of a Bayer pattern included in a 3D sensor pixel group. At this time, the Bayer pattern and the motion sensor pixel M may be arranged according to one of the pixel arrangements 110-1 through 110-4, which are respectively illustrated in FIGS. 4 through 7.

The relative sizes of the motion sensor pixels M and the color sensor pixels C may be modified variously.

Figure 10:
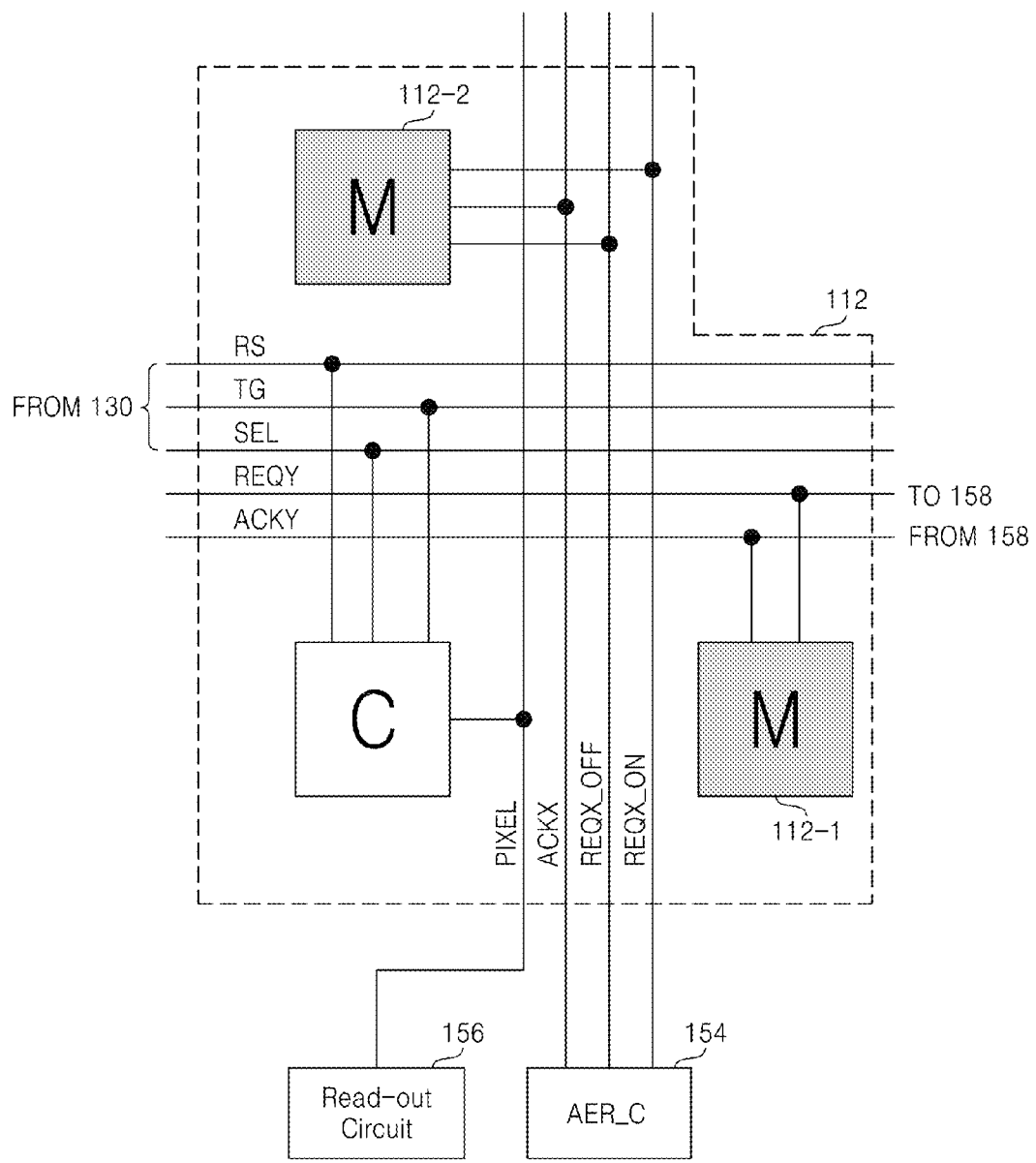
FIG. 10 is a diagram of wiring of the pixel array illustrated in FIG. 4 according to some embodiments.

FIG. 10 is a diagram of wiring of the pixel array 110-1 illustrated in FIG. 4 according to some embodiments. Referring to FIGS. 4 and 10, FIG. 10 shows a part 112 of the pixel array 110 illustrated in FIG. 4, and the column AER 154 and the read-output circuit 156, which are implemented as separate circuits, respectively. The part 112 of the pixel array 110 includes a color sensor pixel C, a first motion sensor pixel 112-1, and a second motion sensor pixel 112-2.

The first motion sensor pixel 112-1 has the same row address as the color sensor pixel C. The second motion sensor pixel 112-2 has the same column address as the color sensor pixel C. Wiring extending in the row direction may include a selection signal line SEL, a reset signal line RS, a transfer signal line TG, a row AER event signal line REQY, and a row AER reset signal line ACKY.

The selection signal line SEL may be connected to the row driver 130 and the color sensor pixel C. The row driver 130 may transmit a selection signal to the color sensor pixel C through the selection signal line SEL.

The reset signal line RS and the transfer signal line TG may also be connected to the row driver 130 and the color sensor pixel C. The row driver 130 may transmit a reset signal and a transmission signal to the color sensor pixel C through the reset signal line RS and the transfer signal line TG, respectively.

The row AER event signal line REQY may be connected to the row AER 158 and the first motion sensor pixel 112-1. The first motion sensor pixel 112-1 may transmit an on/off event signal to the row AER 158 through the row AER event signal line REQY.

The row AER reset signal line ACKY may also be connected to the row AER 158 and the first motion sensor pixel 112-1. The row AER 158 may transmit a first DVS reset signal to the first motion sensor pixel 112-1 through the row AER reset signal line ACKY.

Wiring extending in the column direction may include a pixel signal line PIXEL, a column AER on-event signal line REQX_ON, a column AER off-event signal line REQX_OFF, and a column AER reset signal line ACKX.

The pixel signal line PIXEL may be connected to the read-out circuit 156 and the color sensor pixel C. The color sensor pixel C may transmit a pixel signal to the read-out circuit 156 through the pixel signal line PIXEL.

The column AER on-event signal line REQX_ON may be connected to the column AER 154 and the second motion sensor pixel 112-2. The second motion sensor pixel 112-2 may transmit an on-event signal to the column AER 154 through the column AER on-event signal line REQX_ON.

The column AER off-event signal line REQX_OFF may be connected to the column AER 154 and the second motion sensor pixel 112-2. The second motion sensor pixel 112-2 may transmit an off-event signal to the column AER 154 through the column AER off-event signal line REQX_OFF.

The column AER reset signal line ACKX may be connected to the column AER 154 and the second motion sensor pixel 112-2. The column AER 154 may transmit a second DVS reset signal to the second motion sensor pixel 112-2 through the column AER reset signal line ACKX.

When the pixel array 110 includes depth sensor pixels Z in other embodiments, a wiring structure for the depth sensor pixels Z is substantially the same as that for the color sensor pixel C illustrated in FIG. 10.

The signals transmitted through the signals lines illustrated in FIG. 10 will be described in detail with reference to FIGS. 12A through 13.

Figure 11:
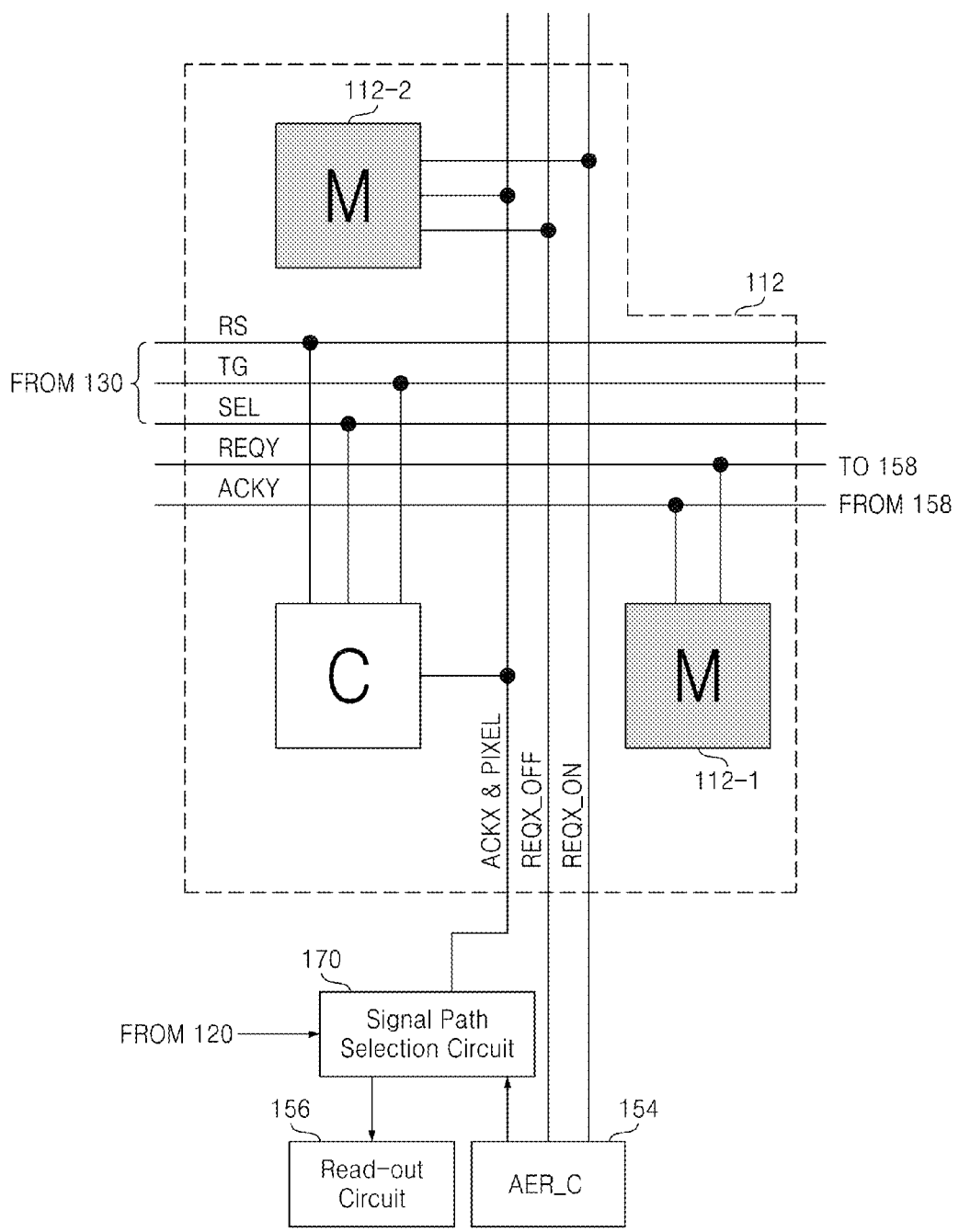
FIG. 11 is a diagram of wiring of the pixel array illustrated in FIG. 4 according to other embodiments.

FIG. 11 is a diagram of wiring of the pixel array 110-1 illustrated in FIG. 4 according to other embodiments. Referring to FIGS. 4 and 11, as for the wiring in the column direction, the pixel signal line PIXEL and the column AER reset signal line ACKX, which are shown in FIG. 10, may be implemented into a common signal line ACKX&PIXEL. In other words, the common signal line ACKX&PIXEL may be connected to the color sensor pixel C, the motion sensor pixel M, and a signal path selection circuit 170.

The signal path selection circuit 170 may connect the common signal line ACKX&PIXEL to the read-out circuit 156 or the column AER 154, according to the control of the control logic 120. The signal path selection circuit 170 may be implemented by a demultiplexer.

When the mode selection signal MSEL is at a first level, e.g., a low level, the control logic 120 may control the signal path selection circuit 170 to connect the common signal line ACKX&PIXEL to the column AER 154. Therefore, the common signal line ACKX&PIXEL may function as the column AER reset signal line ACKX.

When the mode selection signal MSEL is at a second level, e.g., a high level, the control logic 120 may control the signal path selection circuit 170 to connect the common signal line ACKX&PIXEL to the read-out circuit 156. Therefore, the common signal line ACKX&PIXEL may function as the pixel signal line PIXEL.

For convenience, the color sensor pixel C, the first motion sensor pixel 112-1, and the second motion sensor pixel 112-2 are only described in the embodiments illustrated in FIGS. 10 and 11, but the wiring illustrated in FIG. 10 or 11 may be applied to every motion sensor pixel M and every color sensor pixel C included in the pixel array 110.

Figure 12A:
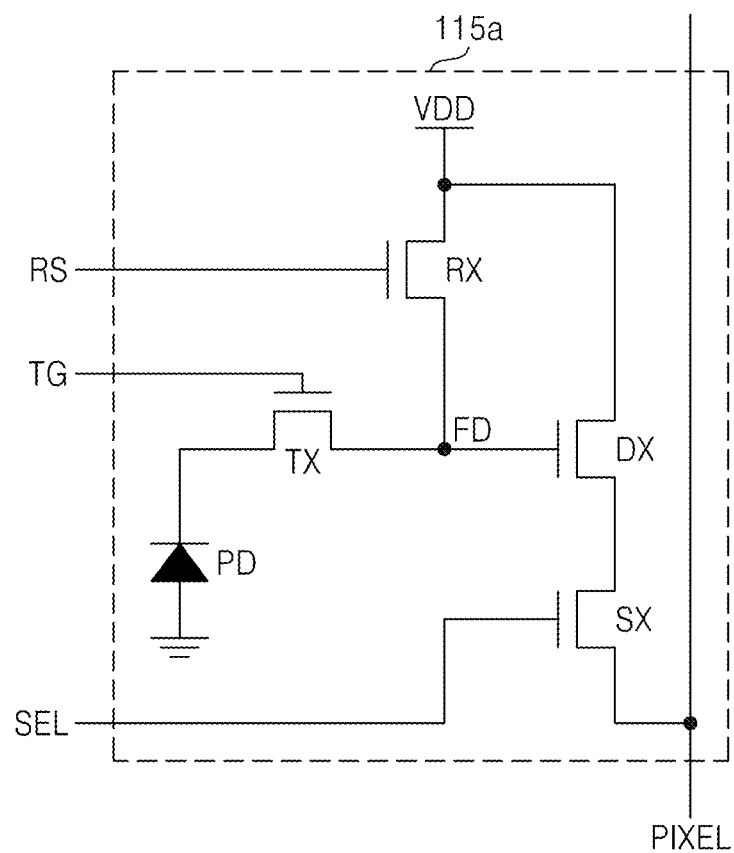
FIG. 12A is a circuit diagram of a color sensor pixel illustrated in FIG. 10 according to some embodiments.
Figure 12B:
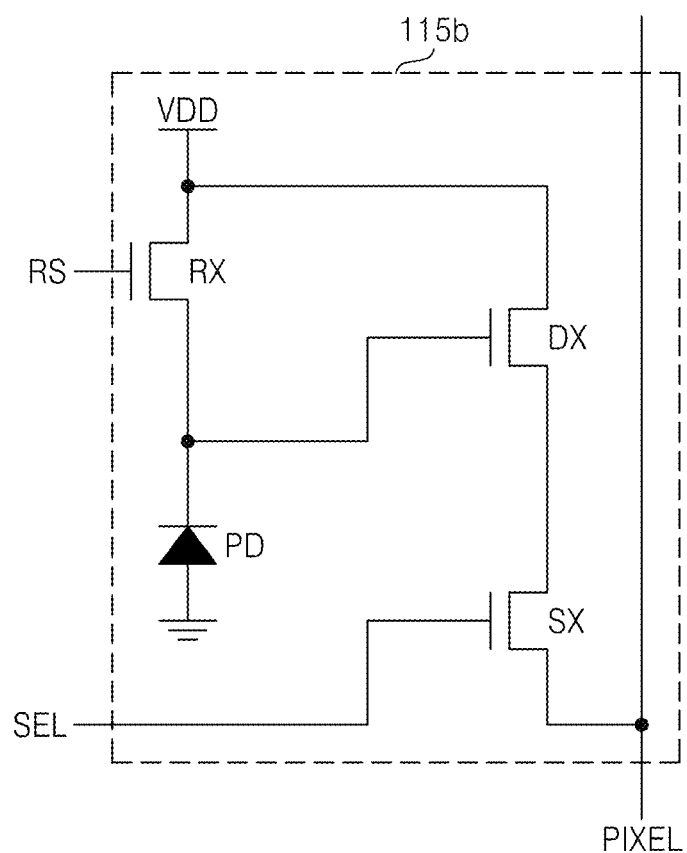
FIG. 12B is a circuit diagram of the color sensor pixel illustrated in FIG. 10 according to other embodiments.
Figure 12C:
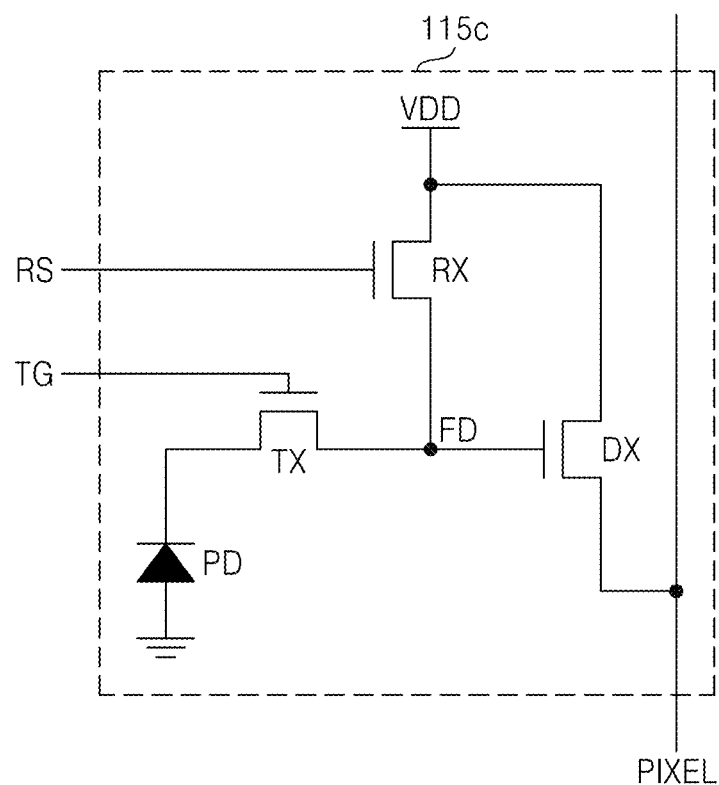
FIG. 12C is a circuit diagram of the color sensor pixel illustrated in FIG. 10 according to further embodiments.
Figure 12D:
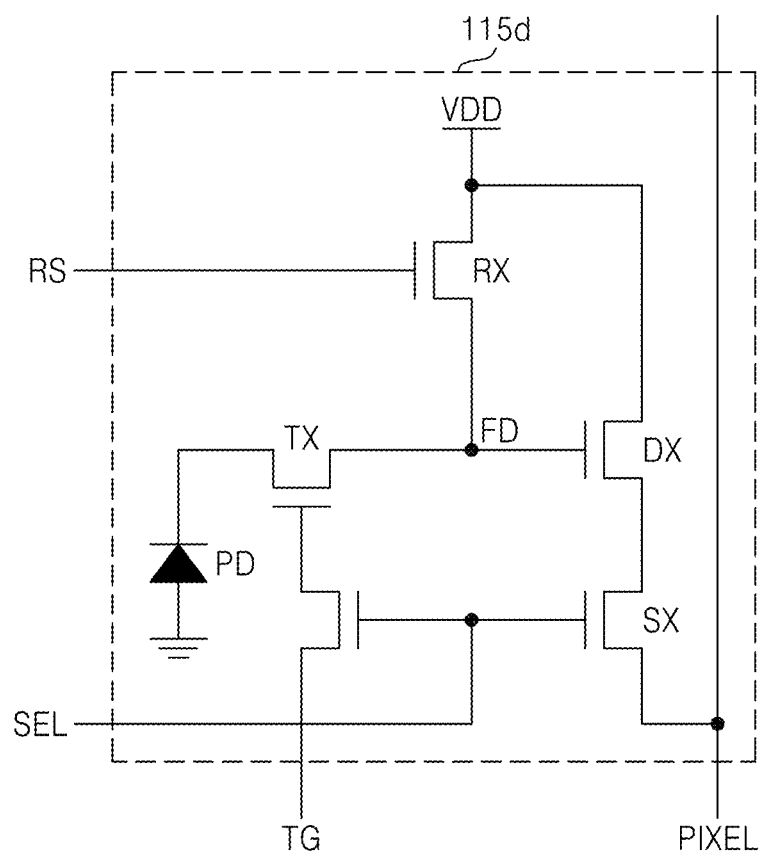
FIG. 12D is a circuit diagram of the color sensor pixel illustrated in FIG. 10 according to other embodiments.
Figure 12E:
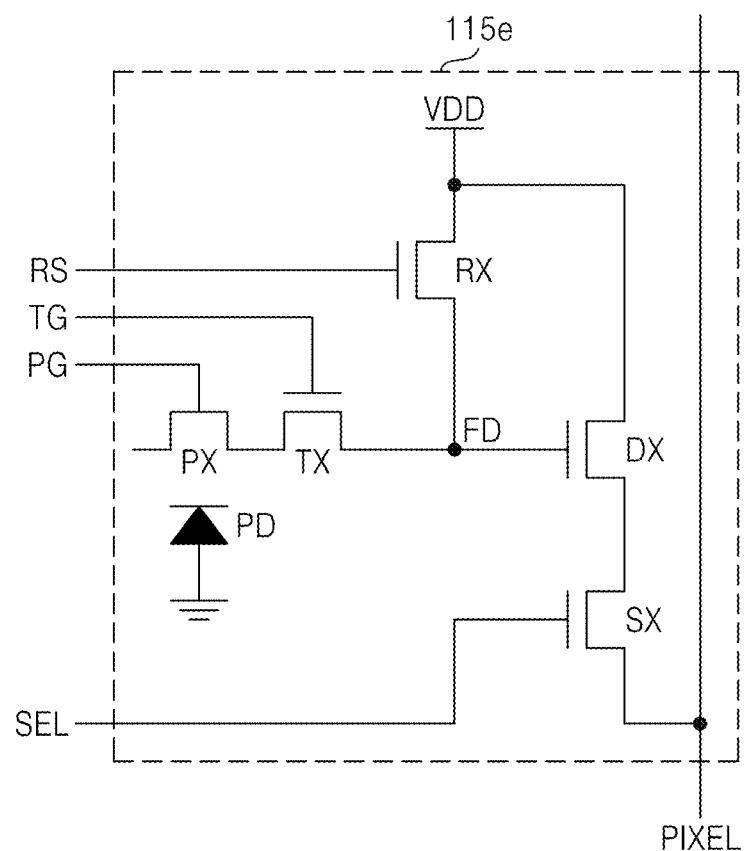
FIG. 12E is a circuit diagram of the color sensor pixel illustrated in FIG. 10 according to other embodiments.

FIG. 12A is a circuit diagram of the color sensor pixel C illustrated in FIG. 10 according to some embodiments. FIG. 12B is a circuit diagram of the color sensor pixel C illustrated in FIG. 10 according to other embodiments. FIG. 12C is a circuit diagram of the color sensor pixel C illustrated in FIG. 10 according to further embodiments. FIG. 12D is a circuit diagram of the color sensor pixel C illustrated in FIG. 10 according to other embodiments. FIG. 12E is a circuit diagram of the color sensor pixel C illustrated in FIG. 10 according to other embodiments.

Referring to FIG. 12A, a unit color sensor pixel 115a may include a photodiode PD, a transfer transistor Tx, a floating diffusion node FD, a reset transistor Rx, a drive transistor Dx, and a select transistor Sx.

The photodiode PD is an example of a photoelectric conversion element. The photodiode PD may be a photo transistor, a photo gate, a pinned photodiode (PPD), or a combination.

FIG. 12A shows a 4-transistor (4T) structure that includes a single photodiode PD and four MOS transistors Tx, Rx, Dx, and Sx. However, the exemplary embodiments are not restricted to this example. Any circuits including at least three transistors, including the drive transistor Dx and the select transistor Sx and the photodiode PD, may be used in the embodiments.

In the operation of the unit color sensor pixel 115a, the photodiode PD generates photocharge varying with the intensity of incident light. The transfer transistor Tx may transfer the photocharge to the floating diffusion node FD, in response to a transfer signal received from the row driver 130 through the transfer signal line TG. The drive transistor Dx may amplify and transmit photocharge to the select transistor Sx based on a potential corresponding to the photocharge accumulated at the floating diffusion node FD. The select transistor Sx has a drain connected to a source of the drive transistor Dx, and may output a selection signal received from the row driver 130 through the selection signal line SEL to the pixel signal line PIXEL connected to the unit color sensor pixel 115a. The reset transistor Rx may reset the floating diffusion node FD to VDD in response to a reset signal received from the row driver 130 through the reset signal line RS.

The unit color sensor pixel 115a may receive incident light through a color filter layer (not shown). The color filter layer may include at least one red filter, at least one green filter, and at least one blue filter, or it may include at least one magenta filter, at least one cyan filter, and at least one yellow filter. The unit color sensor pixel 115a may be classified as a red pixel R, a green pixel G, or a blue pixel B according to the type of the color filter layer. According to the color filter layer, the unit color sensor pixel 115a may sense incident light having a different wavelength, and the ISP 200 may process a pixel signal output from each unit color sensor pixel 115a so as to generate a 2D image.

Other examples of a unit color sensor pixel are illustrated in FIGS. 12B through 12E.

Referring to FIG. 12B, a unit color sensor pixel 115b has a 3-transistor (3T) structure that may include the photodiode PD, the reset transistor Rx, the drive transistor Dx, and the select transistor Sx. Photocharge generated by the photodiode PD may be immediately accumulated at the floating diffusion node FD, and the unit color sensor pixel 115b may output a pixel signal to the pixel signal line PIXEL according to the operations of the drive transistor Dx and the select transistor Sx.

Referring to FIG. 12C, a unit color sensor pixel 115c has a 3T structure that may include the photodiode PD, the transfer transistor Tx, the reset transistor Rx, and the drive transistor Dx. The reset transistor Rx may be implemented by an n-channel depression type transistor. The reset transistor Rx may reset the floating diffusion node FD to VDD or a low level (e.g., 0 V) in response to the reset signal received from the row driver 130 through the reset signal line RS, thereby performing a similar function to the select transistor Sx. In other embodiments, the reset signal may be received through the selection signal line SEL.

Referring to FIG. 12D, a unit color sensor pixel 115d has a 5-transistor (5T) structure that includes the photodiode PD, the transfer transistor Tx, the reset transistor Rx, the drive transistor Dx, the select transistor Sx, and one more transistor Gx.

Referring to FIG. 12E, a unit color sensor pixel 115e has a 5T structure that includes the photodiode PD, the transfer transistor Tx, the reset transistor Rx, the drive transistor Dx, the select transistor Sx, and one more transistor Px.

When the pixel array 110 includes depth sensor pixels Z in other embodiments, the internal structure of the depth sensor pixels Z is substantially the same as the structure illustrated in one of FIGS. 12A through 12E. The depth sensor pixels Z may be implemented in a 2-tap structure, apart from a 1-tap structure, having the same internal structure of the color sensor pixel C illustrated in any one of FIGS. 12A through 12E.

Figure 13:
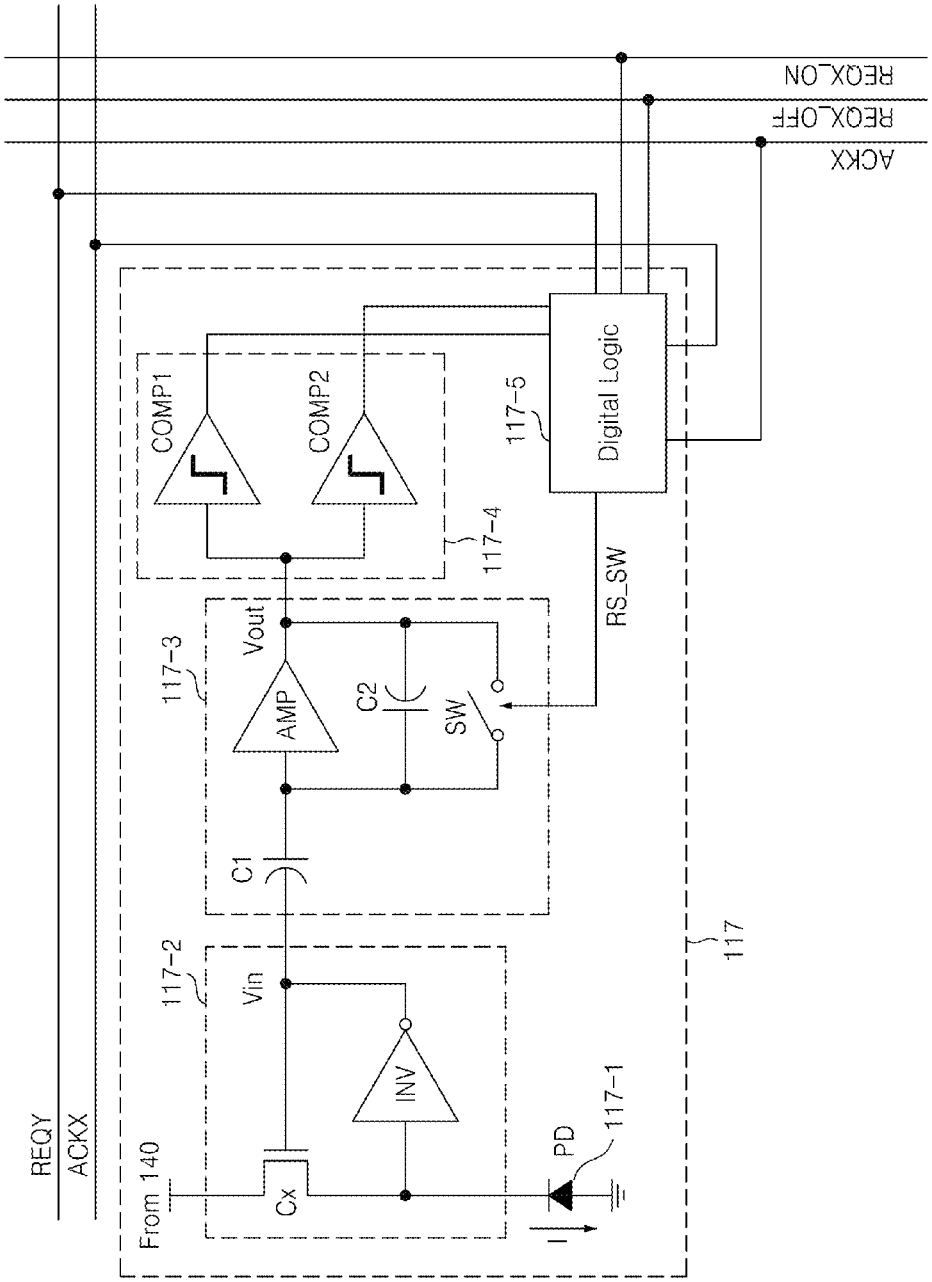
FIG. 13 is a diagram of a motion sensor pixel illustrated in FIG. 10 according to some embodiments.

FIG. 13 is a diagram of the motion sensor pixels M illustrated in FIG. 10 according to some embodiments. Referring to FIGS. 10 and 13, the motion sensor pixels M may be DVS pixels. The operation of each of the motion sensor pixels M, which are DVS pixels, will be described in detail with reference to FIG. 13.

A unit DVS pixel 117 may include a photodiode 117-1, a current-to-voltage (I/V) converter 117-2, an amplifier circuit 117-3, a comparator circuit 117-4, and a digital logic 117-5.

The photodiode 117-1 is an example of a photoelectric conversion element. The photodiode 117-1 may be a photo transistor, a photo gate, a PPD, or a combination thereof. The photodiode 117-1 may generate an optical current I according to the intensity of incident light.

The I/V converter 117-2 may include a converting transistor Cx and an inverter INV. The converting transistor Cx may be provided with power by the motion sensor pixel enable controller 140.

When a motion sensor pixel group is disabled, the motion sensor pixel enable controller 140 may apply a voltage lower than a predetermined level to the converting transistor Cx so that the converting transistor Cx does not operate. The inverter INV may invert a voltage at a terminal of the photodiode 117-1 so as to output a first voltage Vin. In other words, the I/V converter 117-2 may sense the optical current I flowing in the photodiode 117-1 and output the first voltage Vin corresponding to the optical current I.

The amplifier circuit 117-3 may include a first capacitor C1, a second capacitor C2, an amplifier AMP, and a reset switch SW. The amplifier circuit 117-3 may output a second voltage Vout, related with a variance in the first voltage Vin over time, based on the first voltage Vin. The reset switch SW may reset the second voltage Vout to a reset voltage according to the control of the digital logic 117-5.

The comparator circuit 117-4 may include a first comparator COMP1 and a second comparator COMP2. The first comparator COMP1 may compare the second voltage Vout with an on-threshold voltage and generate an on-event signal according to a comparison result. The second comparator COMP2 may compare the second voltage Vout with an off-threshold voltage and generate an off-event signal according to a comparison result. In other words, the comparator circuit 117-4 may generate an on-event signal or off-event signal when the change in shading of the unit DVS pixel 117 is higher than a predetermined level.

For instance, the on-event signal may be at a high level when the shading of the unit DVS pixel 117 is brighter than a predetermined level, and the off-event signal may be at a high level when the shading of the unit DVS pixel 117 is darker than a predetermined level. The on- and off-even signals may be transmitted to the digital logic 117-5.

The digital logic 117-5 may generate an event signal according to the on- and off-event signals output from the comparator circuit 117-4. For instance, the digital logic 117-5 may include an OR gate to receive the on-event signal and the off-event signal and to generate an on/off event signal when one of the on- and off-event signals is at the high level. The on/off event signal may be transmitted to the row AER 158 through the row AER event signal line REQY. The OR gate may be implemented outside the unit DVS pixel 117, for example, inside the row AER 158 in other embodiments.

The digital logic 117-5 may transmit the on-event signal to the column AER 154 through the column AER on-event signal line REQX_ON, and may transmit the off-event signal to the column AER 154 through the column AER off-event signal line REQX_OFF.

The digital logic 117-5 may generate a reset switch signal RS_SW according to the on-event and the off-event signals output from the comparator circuit 117-4. For instance, the digital logic 117-5 may include an OR gate so as to receive the on-event signal and the off-event signal, and generate the reset switch signal RS_SW when one of the on-event and the off-event signals is at the high level. The reset switch SW may reset the second voltage Vout according to the reset switch signal RS_SW. The OR gate may be implemented outside the unit DVS pixel 117 in other embodiments.

The OR gate that generates the on/off event signal may be the same as the OR gate that generates the reset switch signal RS_SW.

The digital logic 117-5 may receive a first DVS reset signal and a second DVS reset signal through the row AER reset signal line ACKY and the column AER reset signal line ACKX, respectively. The digital logic 117-5 may generate the reset switch signal RS_SW according to the first DVS reset signal transmitted from the row AER 158, and the second DVS reset signal transmitted from the column AER 154.

For instance, the digital logic 117-5 may include an AND gate to generate the reset switch signal RS_SW when both the first and second DVS reset signals are at a high level. The AND gate may be implemented outside the unit DVS pixel 117.

The unit DVS pixel 117 illustrated in FIG. 13 is just an example. However, the exemplary embodiments are not limited. The motion sensor pixel M, according to the embodiments, may be applied to any pixel that senses the motion of an object.

Figure 14:
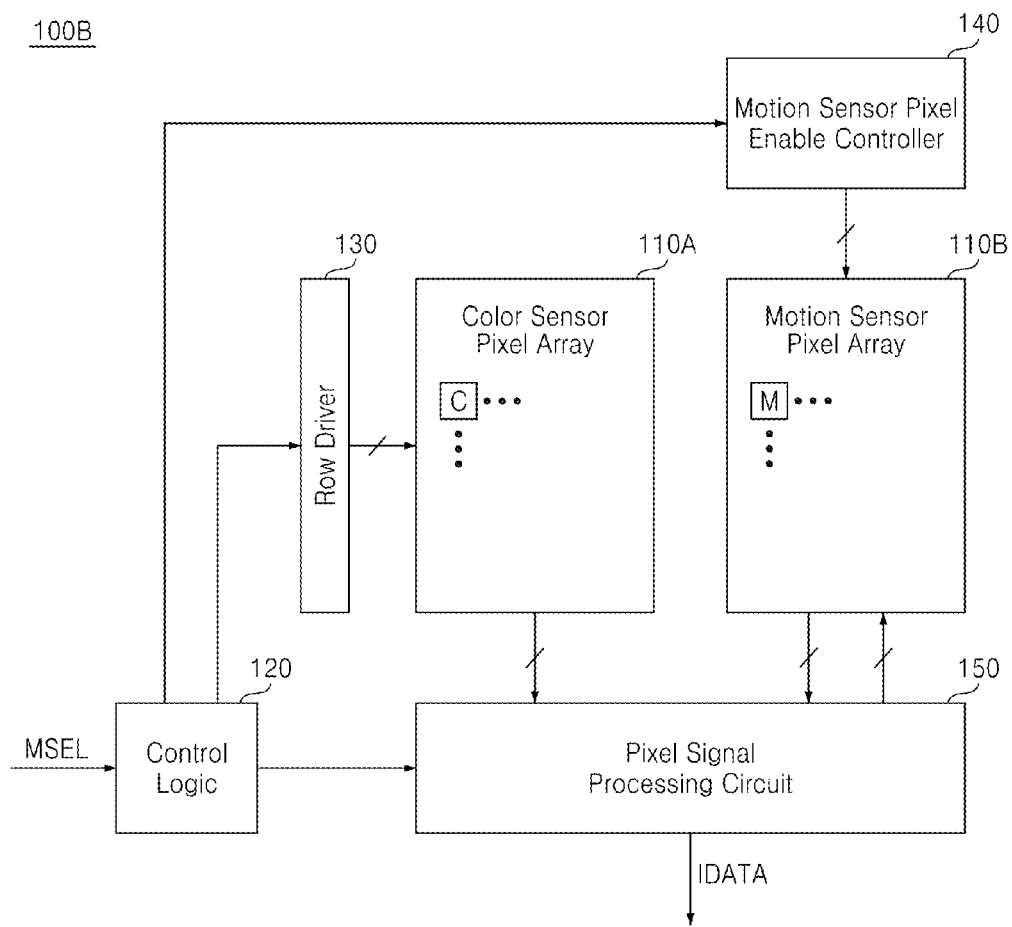
FIG. 14 is a block diagram of the image sensor illustrated in FIG. 1 according to other embodiments.

FIG. 14 is a block diagram of an image sensor 100B according to other embodiments. The image sensor 100B is another example of the image sensor 100 illustrated in FIG. 1. Referring to FIGS. 1 and 14, the image sensor 100B may include a color sensor pixel array 110A including color sensor pixels C only, and a motion sensor pixel array 110B including motion sensor pixel M only. In this case, the row driver 130 may enable the color sensor pixels C in the color sensor pixel array 110A according to the control of the control logic 120. The motion sensor pixel enable controller 140 may control the enabling or disabling of the motion sensor pixels M in the motion sensor pixel array 110B according to the control of the control logic 120.

Figure 15:
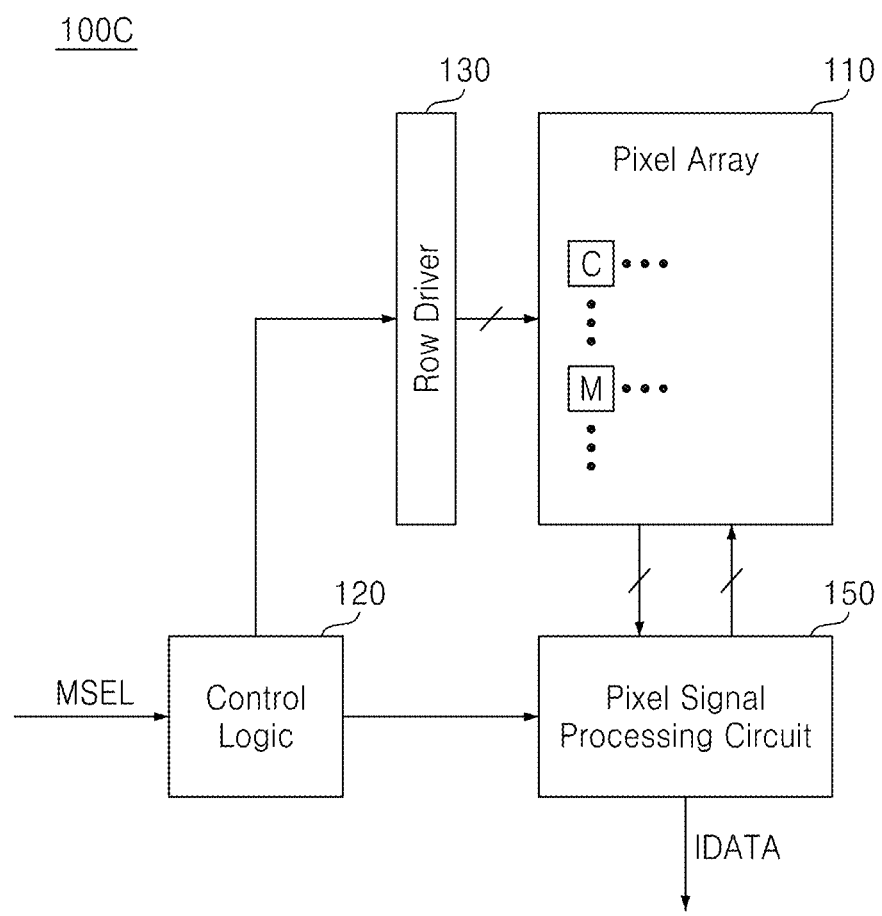
FIG. 15 is a block diagram of the image sensor illustrated in FIG. 1 according to further embodiments.
Figure 16:
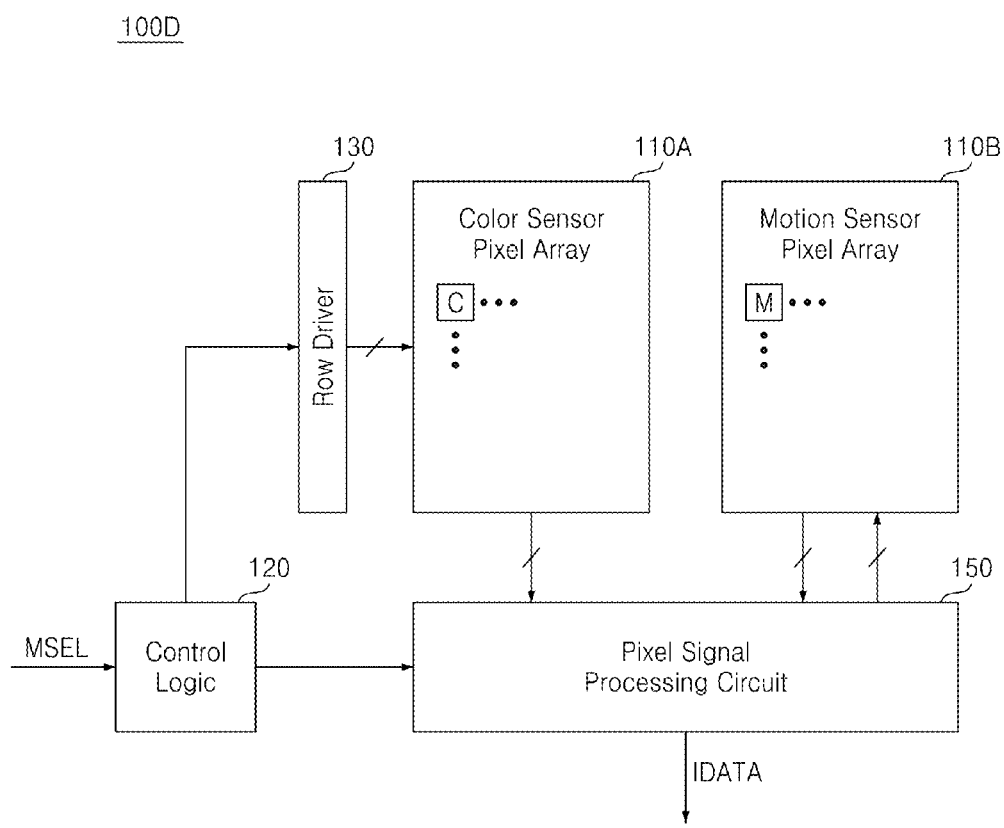
FIG. 16 is a block diagram of the image sensor illustrated in FIG. 1 according to other embodiments.

FIG. 15 is a block diagram of an image sensor 100C according to further embodiments. FIG. 16 is a block diagram of an image sensor 100D according to other embodiments. The image sensors 100C and 100D are other examples of the image sensor 100 illustrated in FIG. 1. Referring to FIGS. 1, 15, and 16, the image sensors 100C and 100D may not include the motion sensor pixel enable controller 140.

The pixel signal processing circuit 150 may control an output of each of the motion sensor pixels M under the control of the control logic 120. In detail, in a state where the motion sensor pixels M are enabled, only output of each of the color sensor pixels C and the motion sensor pixels M can be controlled by the pixel signal processing circuit 150.

When the motion sensor pixels M are DVS pixels, the motion sensor pixels M may not output an event signal according to a signal received from the pixel signal processing circuit 150.

Figure 17:
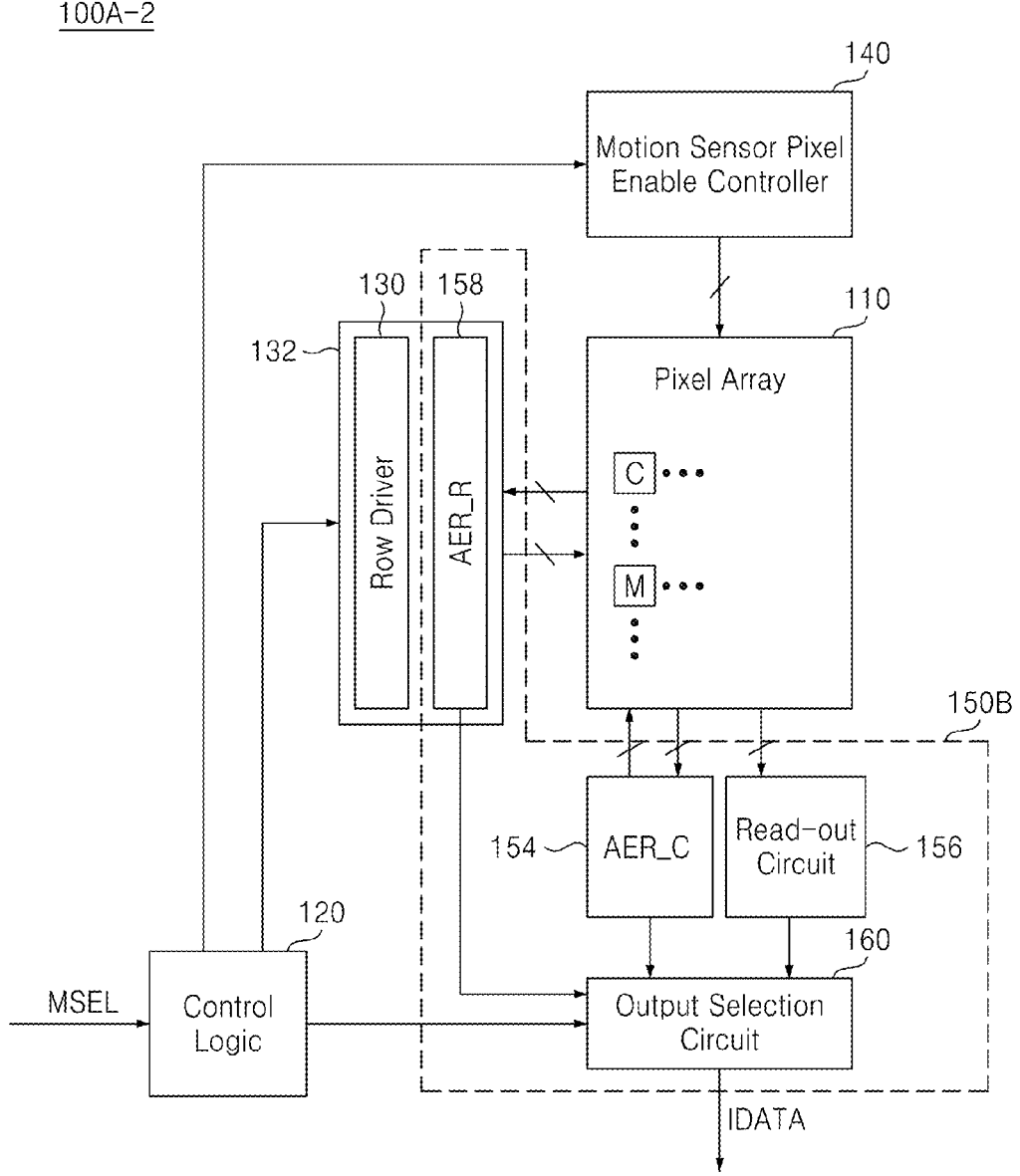
FIG. 17 is a block diagram of an image sensor including another example of the pixel signal processing circuit illustrated in FIG. 2.
Figure 18:
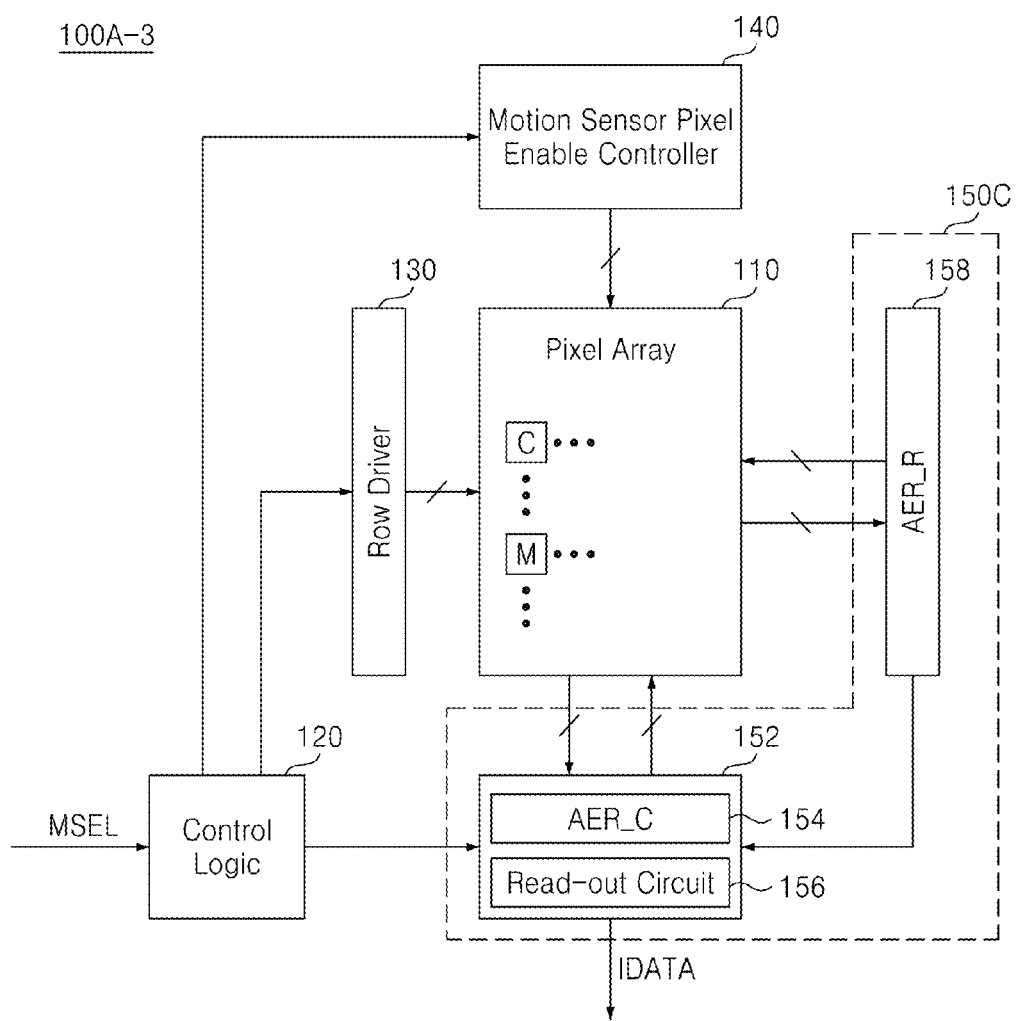
FIG. 18 is a block diagram of an image sensor including another example of the pixel signal processing circuit illustrated in FIG. 2.

FIG. 17 is a block diagram of an image sensor 100A-2 including another example 150B of the pixel signal processing circuit 150 illustrated in FIG. 2. FIG. 18 is a block diagram of an image sensor 100A-3 including another example 150C of the pixel signal processing circuit 150 illustrated in FIG. 2. Referring to FIGS. 2, 17, and 18, the motion sensor pixels M are DVS pixels in the image sensors 110A-2 and 110A-3.

Referring to FIG. 17, the column AER 154 and the read-out circuit 156 may be implemented in separate circuits, respectively, in the pixel signal processing circuit 150B. In addition, the row AER 158 in the pixel signal processing circuit 150B may be implemented at the same side as the row driver 130.

A row AER and row driver block 132 may include the row driver 130 and the row AER 158. The row AER and row driver block 132 may be divided into the row AER 158 and the row driver 130 functionally and logically, but not necessarily physically.

Referring to FIG. 18, the pixel signal processing circuit 150C may include a column AER and read-out circuit block 152 and the row AER 158. The column AER and read-out circuit block 152 may include the column AER 154 and the read-out circuit 156. The column AER and read-out circuit block 152 may be divided into the column AER 154 and the read-out circuit 156 functionally and logically, but not necessarily physically.

The column AER and read-out circuit block 152 may process an event signal output from a motion sensor pixel M, and a pixel signal output from a color sensor pixel C using a single method (or logic). In this case, a separate block for performing analog-to-digital conversion of the pixel signal output from the color sensor pixel C may be implemented inside or outside the column AER and read-out circuit block 152. This will be described in detail with reference to FIG. 19.

The row AER 158 may be implemented opposite the row driver 130. A row address value of a motion sensor pixel M, that has generated an event signal according to the change in the quantity of light, may be transmitted from the row AER 158 to the column AER and read-out circuit block 152.

Figure 19:
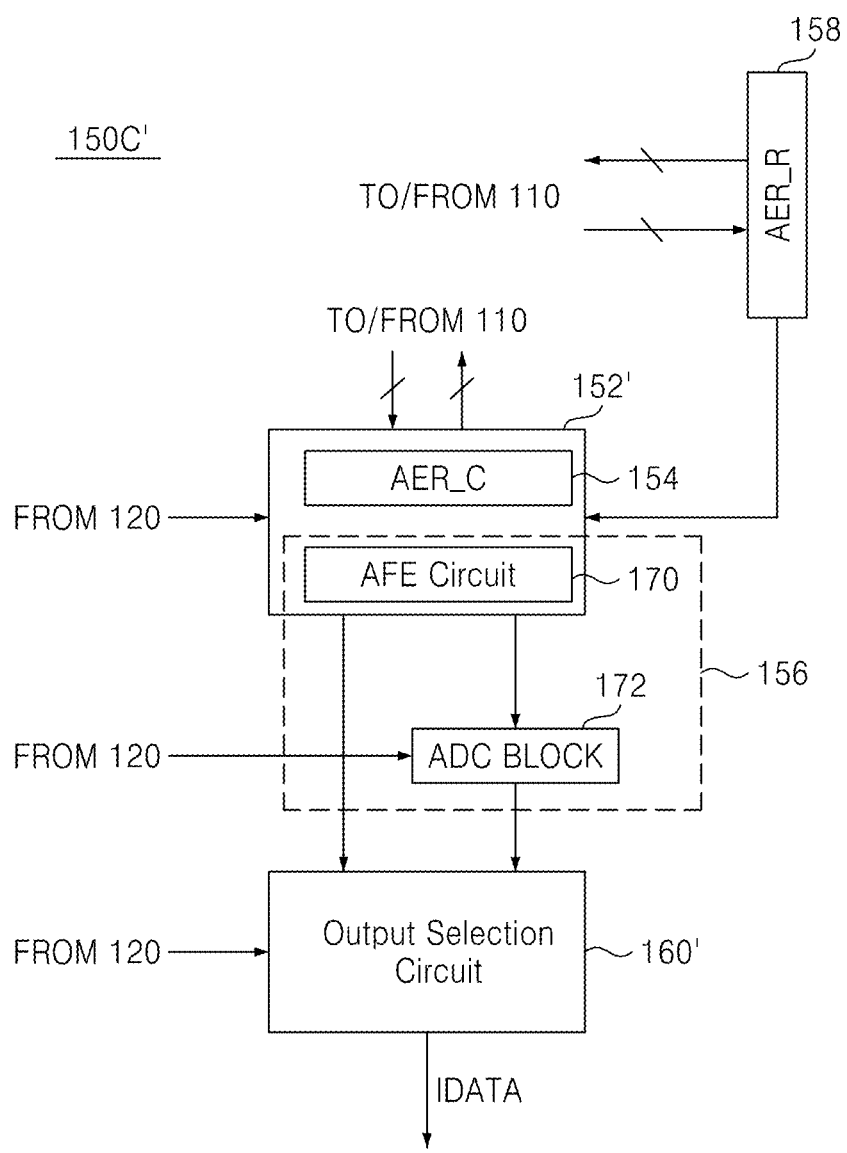
FIG. 19 is a block diagram of a modification of the pixel signal processing circuit illustrated in FIG. 18.

FIG. 19 is a block diagram of a modification 150C' of the pixel signal processing circuit 150C illustrated in FIG. 18. Referring to FIGS. 18 and 19, the pixel signal processing circuit 150' illustrated in FIG. 18 may include a column AER and analog front end (AFE) circuit block 152', the row AER 158, an output selection circuit 160', and an analog-to-digital converter (ADC) block 172.

The column AER and AFE circuit block 152' may include the column AER 154 and an AFE circuit 170. The AFE circuit 170 may be a circuit including elements performing operations before analog-to-digital conversion among elements included in the read-out circuit 156. The column AER and AFE circuit block 152' may be divided into the column AER 154 and the AFE circuit 170 functionally and logically, but not necessarily physically.

The column AER and AFE circuit block 152' may process an event signal output from a motion sensor pixel M and a pixel signal output from a color sensor pixel C using a single method (or logic).

The column AER and AFE circuit block 152' may process an event signal output from a motion sensor pixel M and a pixel signal output from a color sensor pixel C. The column AER and AFE circuit block 152' may send a processing result (e.g., a result of processing the pixel signal from the color sensor pixel C), which requires analog-to-digital conversion, to the ADC block 172 and send a processing result (e.g., a result of processing the event signal from the motion sensor pixel M), which does not require the analog-to-digital conversion, to the output selection circuit 160'.

The ADC block 172 may perform the analog-to-digital conversion on the processing result received from the column AER and AFE circuit block 152' and send a digital signal obtained through the conversion to the output selection circuit 160'. The ADC block 172 may include a CDS circuit (not shown), a ramp generator (not shown), a comparator (not shown), and a counter (not shown), and may perform the analog-to-digital conversion according to the control of the control logic 120.

The output selection circuit 160' may select and process a signal transmitted from the column AER and AFE circuit block 152' and a signal transmitted from the ADC block 172 so as to output the image data IDATA.

Figure 20:
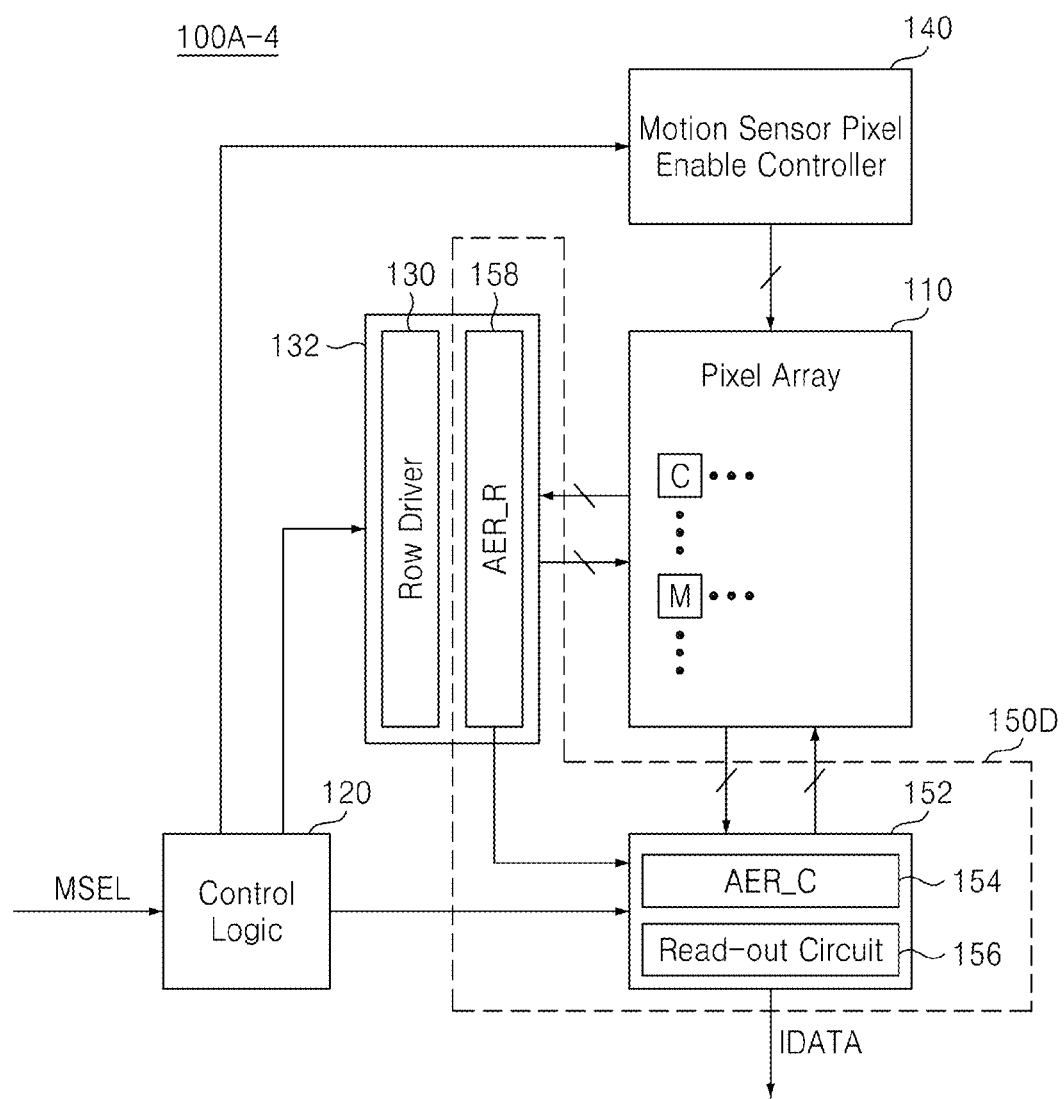
FIG. 20 is a block diagram of an image sensor including another example of the pixel signal processing circuit illustrated in FIG. 2.

FIG. 20 is a block diagram of an image sensor 100A-4 including another example of the pixel signal processing circuit 150 illustrated in FIG. 2. The image sensor 100A-4 includes a pixel signal processing circuit 150D.

The row AER 158 may be implemented at the same side as the row driver 130. The row AER and row driver block 132 may include the row driver 130 and the row AER 158. The row AER and row driver block 132 may be divided into the row AER 158 and the row driver 130 functionally and logically, but not necessarily physically.

Figure 21:
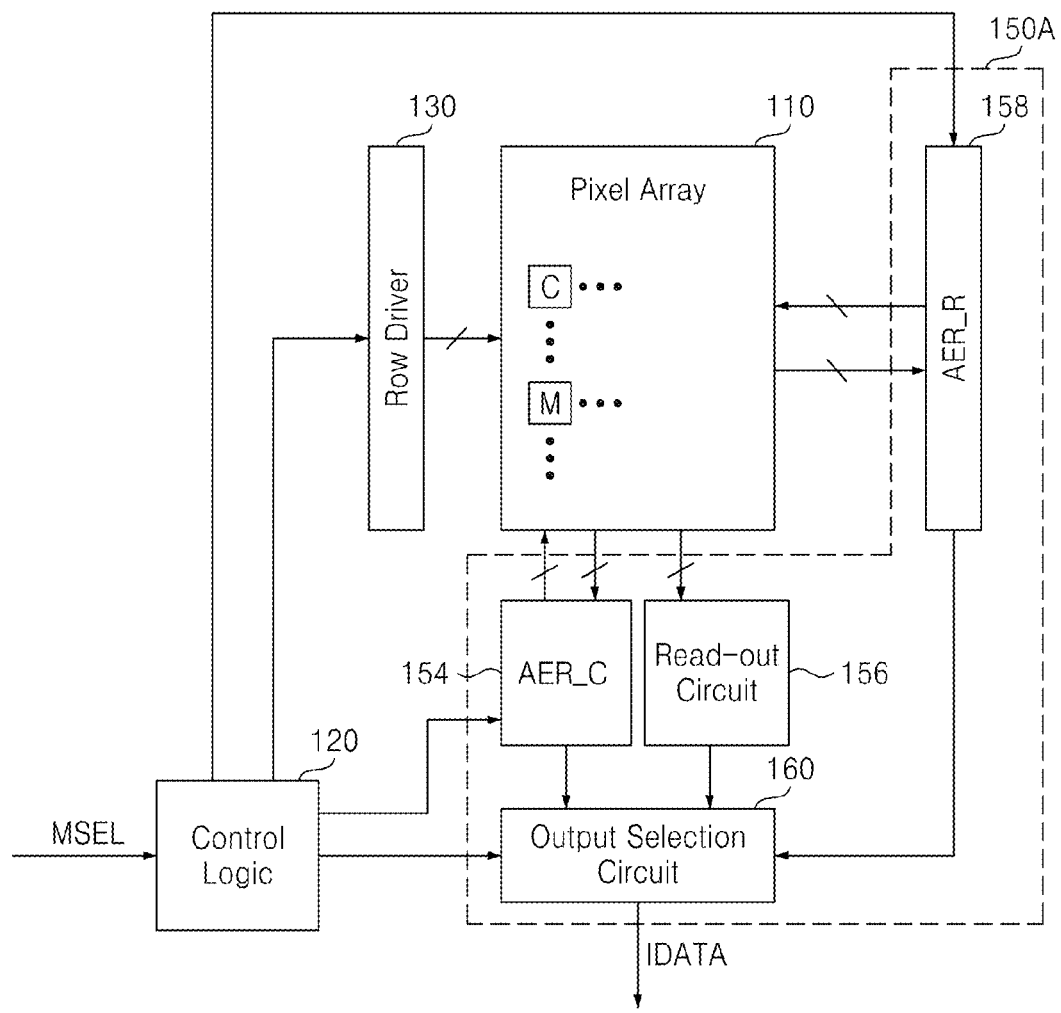
FIG. 21 is a block diagram of an image sensor including an example of a pixel signal processing circuit illustrated in FIG. 15.
Figure 22:
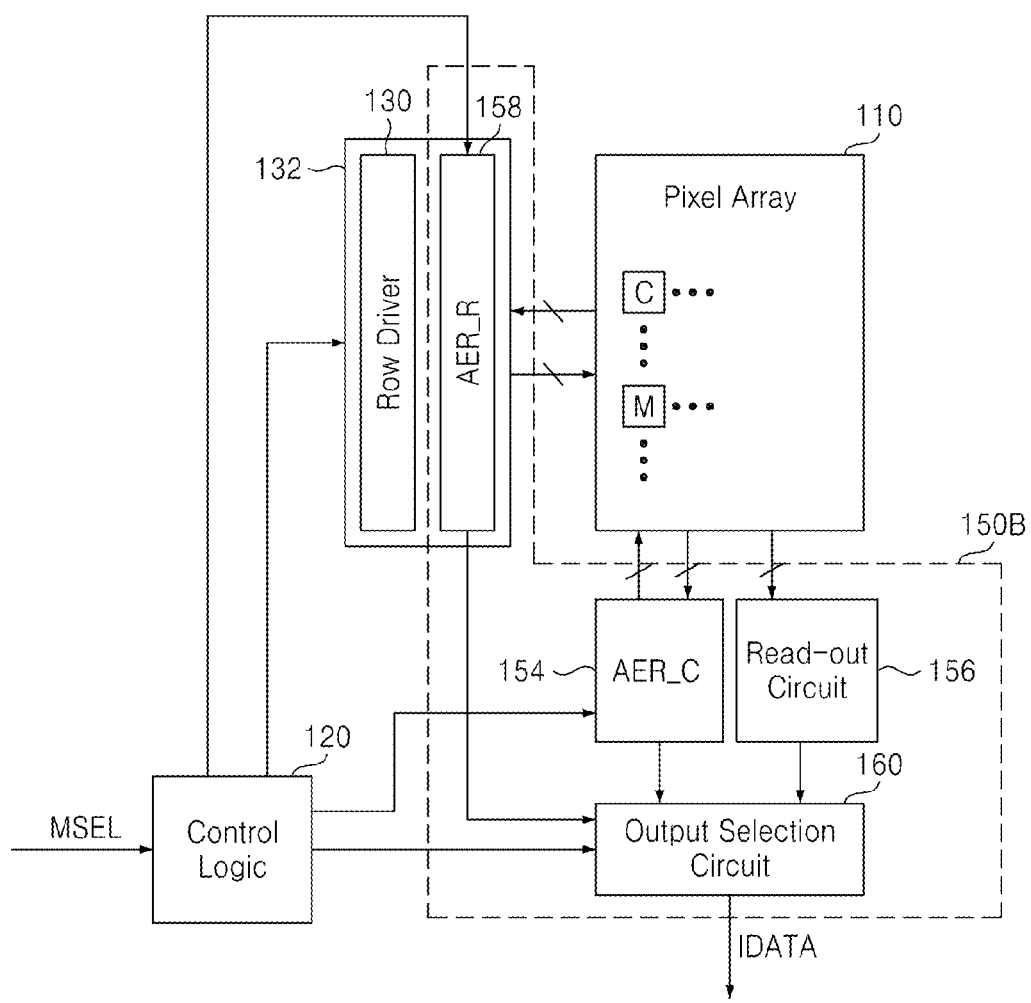
FIG. 22 is a block diagram of an image sensor including another example of the pixel signal processing circuit illustrated in FIG. 15.
Figure 23:
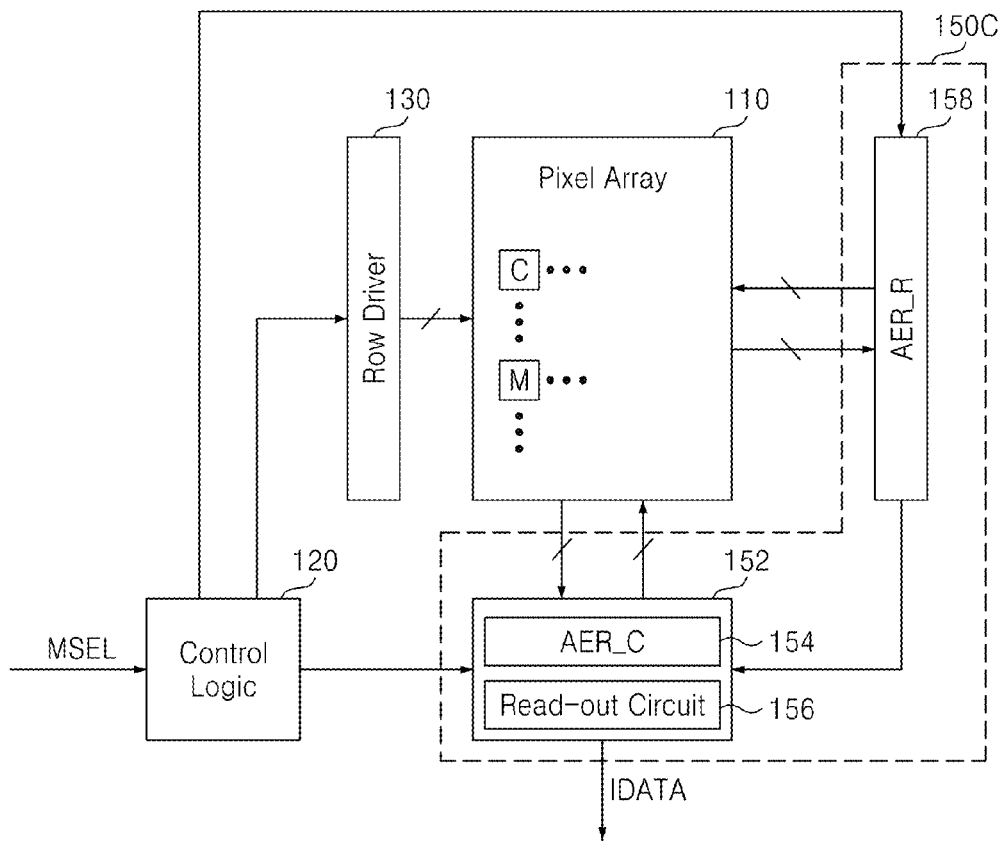
FIG. 23 is a block diagram of an image sensor including another example of the pixel signal processing circuit illustrated in FIG. 15.
Figure 24:
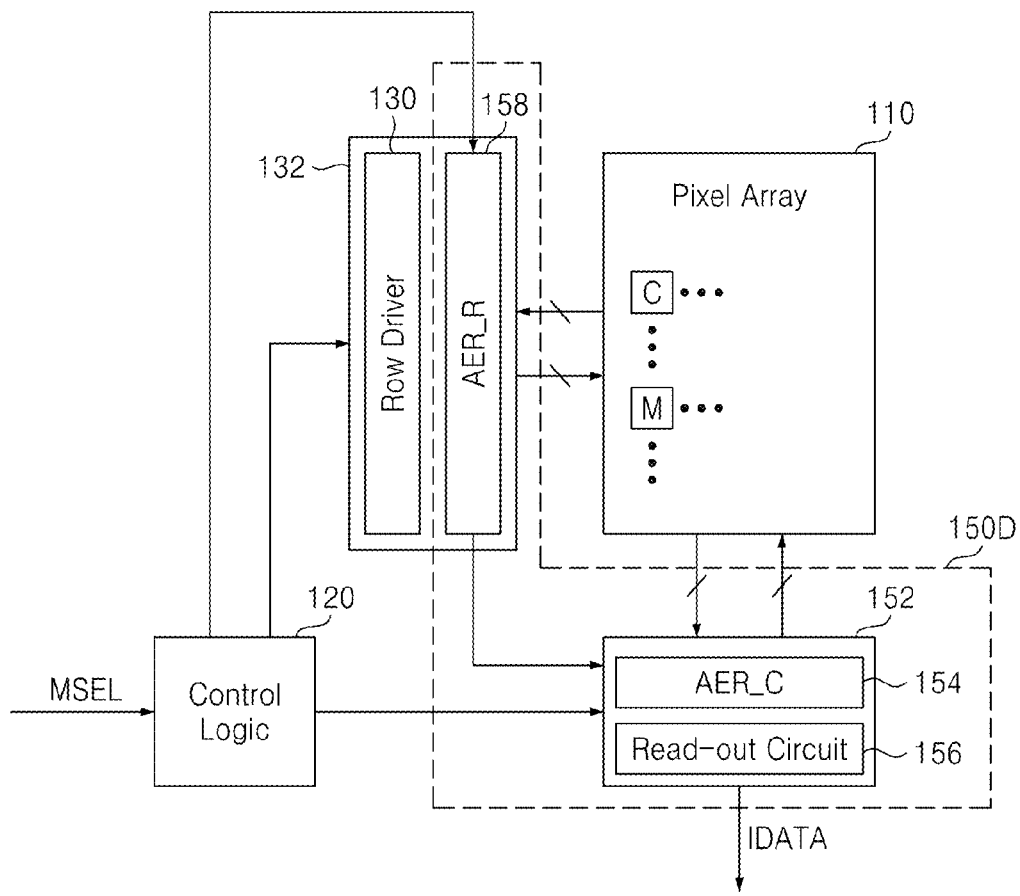
FIG. 24 is a block diagram of an image sensor including another example of the pixel signal processing circuit illustrated in FIG. 15.

FIG. 21 is a block diagram of an image sensor 100C-1 including an example of the pixel signal processing circuit 150 illustrated in FIG. 15. FIG. 22 is a block diagram of an image sensor 100C-2 including another example of the pixel signal processing circuit 150 illustrated in FIG. 15. FIG. 23 is a block diagram of an image sensor 100C-3 including another example of the pixel signal processing circuit 150 illustrated in FIG. 15. FIG. 24 is a block diagram of an image sensor 100C-4 including another example of the pixel signal processing circuit 150 illustrated in FIG. 15.

Referring to FIG. 15 and FIGS. 21 through 24, the image sensors 100C-1 through 100C-4 include motion sensor pixels M implemented by DVS pixels and do not include the motion sensor pixel enable controller 140 illustrated in FIG. 2. The enabled state of the motion sensor pixels M included in the pixel array 110 in the image sensors 100C-1 through 100C-4 are maintained, and the output of the motion sensor pixels M may be controlled by the column AER 154 and the row AER 158.

Referring to FIG. 13 and FIGS. 21 through 24, the column AER 154 and the row AER 158 may maintain the voltage Vout, which is a reference based on which the motion sensor pixels M generate an event signal, at an initial state (e.g., a reset state) according to the control of the control logic 120, thereby inhibiting the motion sensor pixels M from generating an output (i.e., the event signal). For instance, when the color sensor pixels C are enabled according to the mode selection signal MSEL, the column AER 154 and the row AER 158 may inhibit the motion sensor pixels M from generating an output (e.g., an event signal) according to the control of the control logic 120.

Apart from the above-described feature, the structures and the operations of the pixel signal processing circuits 150A through 150D respectively illustrated in FIGS. 21 through 24 are substantially the same as those of the pixel signal processing circuit 150A through 150D, which are respectively illustrated in FIGS. 3, 17, 18, and 20.

Figure 25:
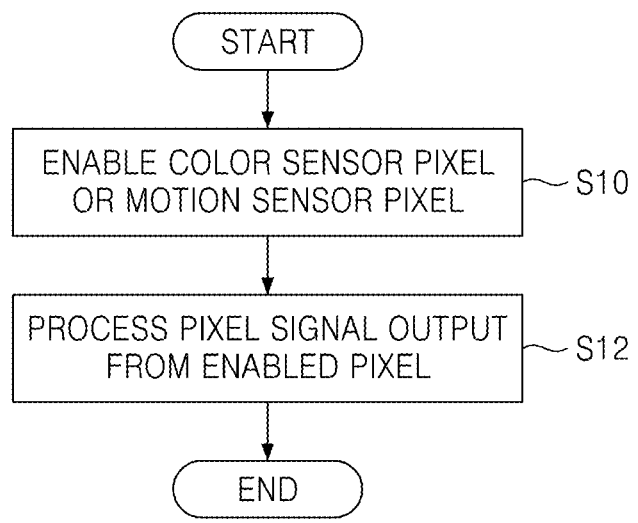
FIG. 25 is a flowchart of a method of operating an image sensor chip according to some embodiments.

FIG. 25 is a flowchart of a method of operating an image sensor chip according to some embodiments. Referring to FIGS. 1 through 3 and FIGS. 14 through 25, the control logic 120 may enable a color sensor pixel C or a motion sensor pixel M based on the mode selection signal MSEL in operation S10.

The mode selection signal MSEL may be generated by the CPU 210 according to a result of analyzing a user's input entered through the peripheral circuit 220, e.g., an input interface. The control logic 120 may enable the color sensor pixel C by controlling the row driver 130 and enable the motion sensor pixel M by controlling the motion sensor pixel enable controller 140.

The pixel signal processing circuit 150 may process a pixel signal output from the color sensor pixel C or the motion sensor pixel M, which has been enabled, in operation S12.

Figure 26:
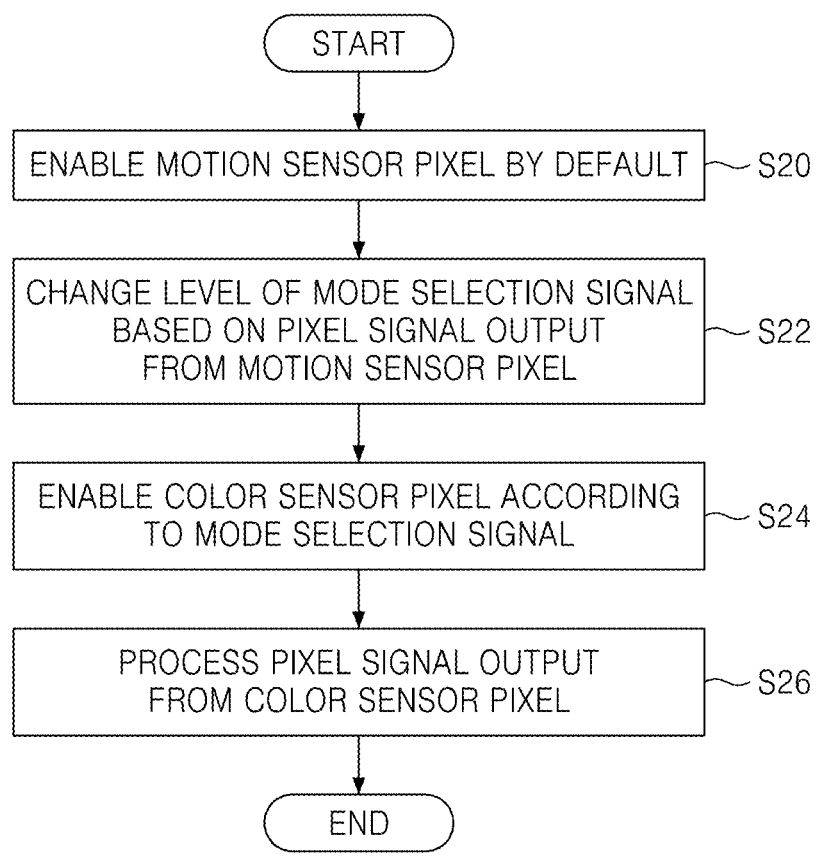
FIG. 26 is a flowchart of a method of operating an image sensor chip according to other embodiments.

FIG. 26 is a flowchart of a method of operating an image sensor chip according to other embodiments. Referring to FIGS. 1 through 3 and FIGS. 14 through 26, when the image processing system 10 is powered on, the CPU 210 may output the mode selection signal MSEL at a level set by default. The control logic 120 may enable a motion sensor pixel M by default, based on the mode selection signal MSEL in operation S20.

A pixel signal output from the motion sensor pixel M that has been enabled may be processed by the pixel signal processing circuit 150, and provided as the image data IDATA for the ISP 200. The ISP 200 may process the image data IDATA and transmit the processed image data IDATA' to the CPU 210. The CPU 210 may change the level of the mode selection signal MSEL based on the processed image data IDATA' in operation S22. In other words, the CPU 210 may change the level of the mode selection signal MSEL based on the pixel signal output from the motion sensor pixel M.

Operations S24 and S26 are substantially the same as operations S10 and S12 illustrated in FIG. 25. Thus, detailed descriptions will be omitted.

Figure 27:
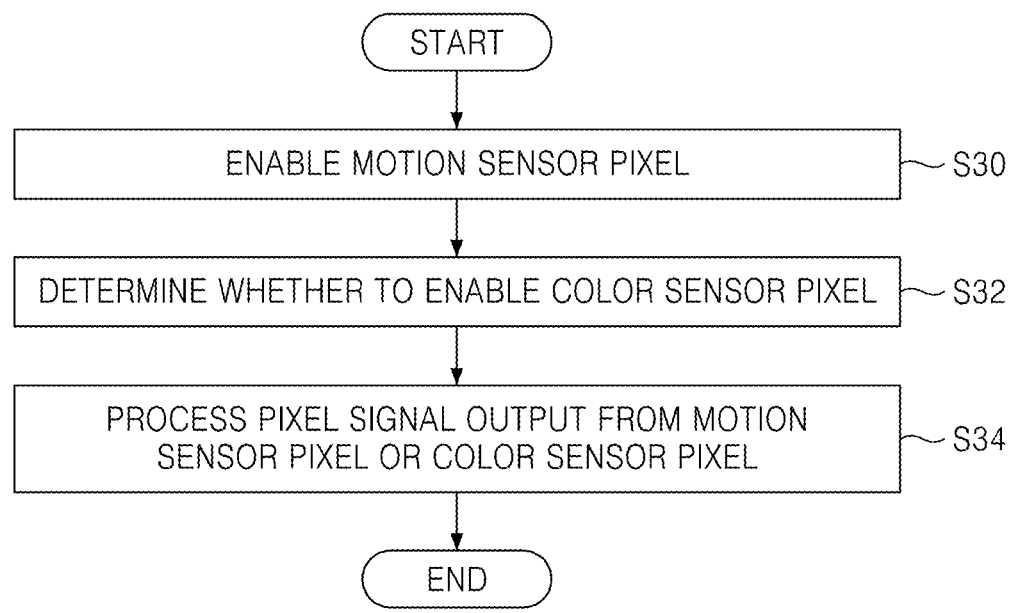
FIG. 27 is a flowchart of a method of operating an image sensor chip according to further embodiments.

FIG. 27 is a flowchart of a method of operating an image sensor chip according to further embodiments. Referring to FIGS. 2, 3, 14 through 24, and 27, the motion sensor pixel enable controller 140 may enable a motion sensor pixel M in operation S30.

The control logic 120 may determine whether to enable a color sensor pixel C based on the mode selection signal MSEL in operation S32. The pixel signal processing circuit 150 may process a pixel signal output from the motion sensor pixel M or the color sensor pixel C in operation S34. The pixel signal processing circuit 150 may process the pixel signal output from the color sensor pixel C when the color sensor pixel C is enabled and may process the pixel signal output from the motion sensor pixel M when the color sensor pixel C is not enabled. Alternatively, when the color sensor pixel C is enabled, the output selection circuit 160 may select and process the pixel signal from the motion sensor pixel M or the pixel signal from the color sensor pixel C and output the image data IDATA.

Figure 28:
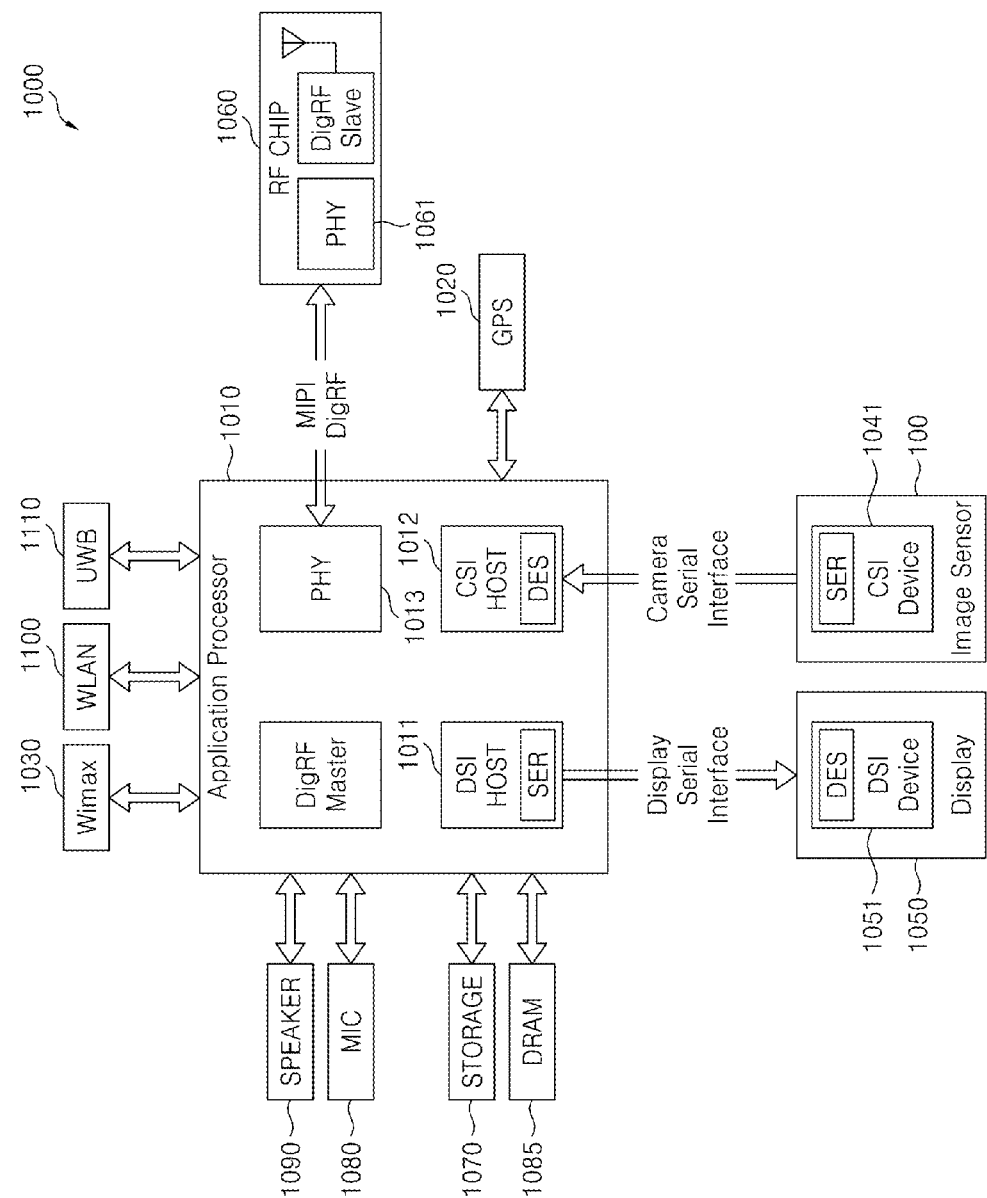
FIG. 28 is a block diagram of an electronic system including an image sensor illustrated in FIG. 1 according to some embodiments.

FIG. 28 is a block diagram of an electronic system 1000 including an image sensor 100 illustrated in FIG. 1 according to some embodiments. Referring to FIGS. 1 and 28, the electronic system 1000 may be implemented by a data processing apparatus, such as a mobile phone, a personal digital assistant (PDA), a portable media player (PMP), an IP TV, or a smart phone that can use or support the mobile industry processor interface (MIPI) interface. The electronic system 1000 includes the image sensor 100, an application processor 1010, and a display 1050.

A camera serial interface (CSI) host 1012 included in the application processor 1010 performs serial communication with a CSI device 1041 included in the image sensor 1040 through CSI. For example, an optical serializer may be implemented in the CSI host 1012, and an optical de-serializer may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060 which communicates with the application processor 1010. A physical channel (PHY) 1013 of the electronic system 1000 and a PHY of the RF chip 1060 communicate data with each other according to a MIPI DigRF standard. The electronic system 1000 may further include at least one element among a GPS 1020, a storage device 1070, a microphone 1080, a dynamic random access memory (DRAM) 1085, and a speaker 1290. The electronic system 1000 may communicate using world interoperability for microwave access (Wimax) 1030, wireless lan (WLAN) 1100 or ultra wideband (UWB) 1110, etc.

Figure 29:
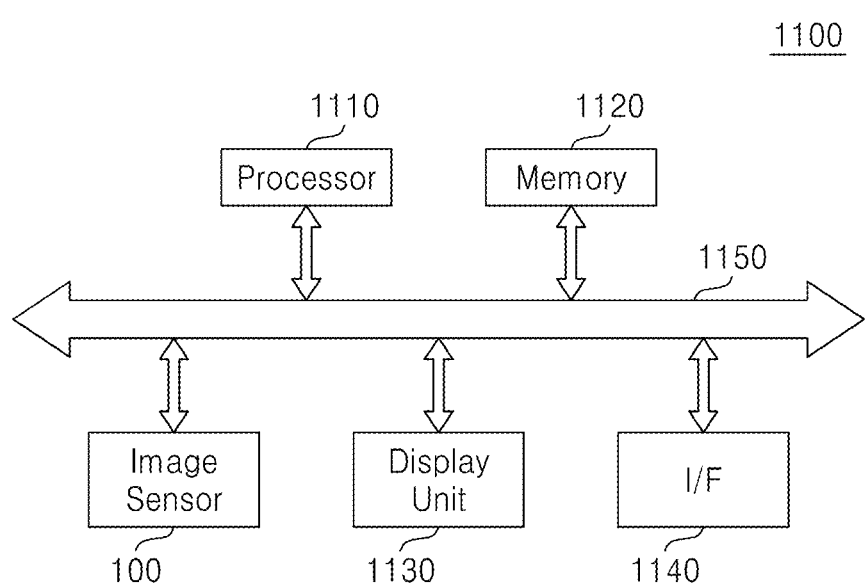
FIG. 29 is a block diagram of a system including the image sensor illustrated in FIG. 1 according to some embodiments.

FIG. 29 is a block diagram of an image processing system 1100 including the image sensor 100 illustrated in FIG. 1 according to some embodiments. Referring to FIGS. 1 and 29, the image processing system 1100 may include the image sensor 100, a processor 1110, a memory 1120, a display unit 1130, and an interface 1140.

The processor 1110 may control the operations of the image sensor 100. The processor 1110 may generate 2D, 3D and/or motion image data based on color information, depth information, and motion information received from the image sensor 100.

The memory 1120 may store a program for controlling the operations of the image sensor 100 through a bus 1150 according to the control of the processor 1110 and images generated by the processor 1110. The processor 1110 may access the information stored in the memory 1120 and execute the program. The memory 1120 may be implemented by a non-volatile memory.

The image sensor 100 may generate 2D, 3D and/or motion image data based on a digital pixel signal (e.g., color information, depth information, or motion information) under the control of the processor 1110. The display unit 1130 may display images received from the processor 1110 or the memory 1120 using a display (e.g., a liquid crystal display (LCD) or an active matrix organic light emitting diode (AMOLED) display). The interface 1140 may be provided for the input or output of 2D or 3D images. The interface 1140 may be implemented as wireless interface.

Exemplary embodiments can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the exemplary embodiments can be easily construed by programmers.

As described above, according to some embodiments image data is obtained based on pixel signals output from color sensor pixels, so that a 2D color image of an object can be precisely recognized. In addition, in other cases, image data is obtained based on pixel signals output from motion sensor pixels, so that power consumption can be reduced. In other words, according to specific circumstances, a selection can be performed to either precisely recognize the 2D color image of an object or reduce power consumption.

While exemplary embodiments have been particularly shown and described with reference to exemplary embodiments it will be understood by those of ordinary skill in the art that various changes in forms and details may be made therein without departing from the spirit and scope of the exemplary embodiments as defined by the following claims.

What is claimed is:

1. An image sensor chip comprising:
    a pixel array comprising a color sensor pixel group, the color sensor pixel group comprises a plurality of color sensor pixels, and a dynamic vision sensor (DVS) pixel group, the DVS pixel group comprises a plurality of DVS pixels sensing a motion of an object;
    a control circuit which is configured to enable one of the color sensor pixel group and the DVS pixel group according to a mode selection signal; and
    a pixel signal processing circuit which is configured to process pixel signals, output from the enabled pixel group.

2. The image sensor chip of claim 1, further comprising a motion sensor pixel enable controller, which is configured to control a power supply to the DVS pixel group according to a control of the control circuit.

3. The image sensor chip of claim 1, wherein the pixel signal processing circuit comprises:
    a row address event representation (AER) which is configured to process at least one of a plurality of event signals generated by the respective DVS pixels; and
    a column AER which is configured to process at least another one of the event signals generated by the respective DVS pixels, and
    the row AER is disposed opposite a row driver which enables each of the color sensor pixels.

4. The image sensor chip of claim 1, wherein the pixel signal processing circuit comprises:
    a row address event representation (AER) which is configured to process at least one of a plurality of event signals generated by the respective DVS pixels; and
    a column AER which is configured to process at least another one of the event signals generated by the respective DVS pixels, and
    the row AER is disposed at a same side as a side of a row driver which enables each of the color sensor pixels.

5. The image sensor chip of claim 1, wherein the DVS pixel group is separately disposed from the color sensor pixel group.

6. The image sensor chip of claim 1, wherein each of the DVS pixels is disposed among the color sensor pixels.

7. The image sensor chip of claim 1, wherein the DVS pixels are disposed at an edge of the color sensor pixel group.

8. The image sensor chip of claim 1, wherein the DVS pixels alternate with the color sensor pixels in a row direction.

9. The image sensor chip of claim 1, wherein the DVS pixels alternate with the color sensor pixels in a column direction.

10. The image sensor chip of claim 1, wherein the DVS pixels are a different size than the color sensor pixels.

11. The image sensor chip of claim 1, wherein among the DVS pixels and the color sensor pixels, a DVS pixel and a color sensor pixel that have a same column address share at least one signal line with each other.

12. The image sensor chip of claim 1, wherein the pixel signal processing circuit comprises:
    a motion sensor pixel signal processing circuit which is configured to process the pixel signals output from the DVS pixel group; and
    a color sensor pixel signal processing circuit which is configured to process the pixel signals output from the color sensor pixel group.

13. The image sensor chip of claim 12, further comprising an output selection circuit which is configured to select one of an output of the motion sensor pixel signal processing circuit and an output of the color sensor pixel signal processing circuit.

14. A system-on-chip (SoC) comprising:
the image sensor chip of claim 1;
an image signal processor (ISP) which is configured to process image data output from the image sensor; and
a central processing unit (CPU) which is configured to receive processed image data from the ISP and generate the mode selection signal based on the processed image data.

15. An image sensor chip comprising:
a pixel array comprising a color sensor pixel, a depth sensor pixel, and a dynamic vision sensor (DVS) pixel; and
an output selection circuit which is configured to select one of a signal received from the color sensor pixel and the depth sensor pixel and a signal received from the DVS pixel according to a mode selection signal, and output the selected signal.

16. The image sensor chip of claim 15, wherein the color sensor pixel is a pixel selected from a group consisting of a red pixel, a green pixel, and a blue pixel, and
wherein the color sensor pixel and the depth sensor pixel are arranged in a Bayer pattern.

17. The image sensor chip of claim 15, wherein the output selection circuit comprises a multiplexer.

18. An image processing system comprising:
an image sensor which generates digital image data corresponding to either color image data from at least one color sensor pixel or motion image data from at least one motion sensor pixel, and transmits the digital image data;
an image signal processor (ISP) which is configured to receive and process the digital image data from the image sensor, and transmit the processed image data;
a central processing unit (CPU) which is configured to generate a mode selection signal according to one of the processed image data from the ISP and a signal from a power monitoring module, and transmit the mode selection signal; and
a display unit which receives the processed image data from the ISP, and displays the processed image data.

19. The image processing system of claim 18, wherein the power monitoring module determines whether the image processing system has sufficient power, and transmits the signal from the power monitoring module to the CPU when the image processing system does not have sufficient power.

20. The image processing system of claim 18, wherein the image sensor generates the digital image data corresponding to either the color image data or the motion image data based on the mode selection signal from the CPU.

* * * * *